(12) United States Patent
Smith et al.

(10) Patent No.: US 10,422,458 B2
(45) Date of Patent: Sep. 24, 2019

(54) FLEX DUCT CONNECTION SYSTEM

(71) Applicant: Owens Corning Intellectual Capital, LLC, Toledo, OH (US)

(72) Inventors: Mark Howard Smith, Newark, OH (US); Neil Robert Hettler, Granville, OH (US); Katrina Keeley, Westerville, OH (US); Weigang Qi, Westerville, OH (US); David H. Wolf, Newark, OH (US); Clarke Berdan, II, Granville, OH (US); Frank Sidney Tyler, Westerville, OH (US); James Rinne, Granville, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 675 days.

(21) Appl. No.: 15/068,987

(22) Filed: Mar. 14, 2016

(65) Prior Publication Data

US 2016/0265699 A1 Sep. 15, 2016

Related U.S. Application Data

(60) Provisional application No. 62/132,628, filed on Mar. 13, 2015, provisional application No. 62/168,979, filed on Jun. 1, 2015.

(51) Int. Cl.
*F16L 33/00* (2006.01)
*F16L 41/08* (2006.01)
*F24F 13/02* (2006.01)

(52) U.S. Cl.
CPC ............... *F16L 33/00* (2013.01); *F16L 41/08* (2013.01); *F24F 13/0209* (2013.01); *F24F 13/0218* (2013.01)

(58) Field of Classification Search
CPC . F16L 33/00; F16L 41/08; F16L 33/01; F16L 33/227; F16L 33/28; F16L 41/086; F16L 41/10; F16L 41/14
See application file for complete search history.

(56) References Cited

U.S. PATENT DOCUMENTS 524,051 A    8/1894  Walker
840,536 A *  1/1907  Weir ...................... F16L 33/01
                                              138/109
(Continued)

FOREIGN PATENT DOCUMENTS

AU    2013200598    10/2013
CN    102345776    2/2012
(Continued)

OTHER PUBLICATIONS

DuraTite Systems LLC, Energy Efficient, Self-Sealing Duct Take Off, 2 pg. brochure, date is at least as early as the filing date of the subject application.

(Continued)

*Primary Examiner* — David Bochna
*Assistant Examiner* — James A Linford
(74) *Attorney, Agent, or Firm* — Calfee, Halter & Griswold LLP

(57) ABSTRACT

An exemplary duct system includes a rigid duct member, a first duct connector connected to the rigid duct member, a first sealing member disposed between the rigid duct member and the first duct connector, a flexible duct, a second duct connector connected to the flexible duct, and a second sealing member disposed between the first duct connector and the second duct connector. The first duct connector is assembled to the second duct connector to compress the second sealing member and form a seal between the first duct connector and the second duct connector and thereby (Continued)

form a seal between the rigid duct member and the flexible duct.

8 Claims, 45 Drawing Sheets

(56) References Cited

U.S. PATENT DOCUMENTS

| | | | | |
|---|---|---|---|---|
| 2,685,458 | A | * | 8/1954 | Shaw .................... F16L 33/01 |
| | | | | 285/222.4 |
| 2,772,898 | A | * | 12/1956 | Seeler .................... F16L 29/00 |
| | | | | 285/129.1 |
| 2,799,518 | A | | 7/1957 | Anderson et al. |
| 3,010,738 | A | | 11/1961 | Greenlaw |
| 3,212,796 | A | * | 10/1965 | Nenschotz ............. F16B 39/06 |
| | | | | 285/136.1 |
| 3,477,745 | A | | 11/1969 | Williams et al. |
| 3,596,936 | A | | 8/1971 | Dieckmann et al. |
| 3,618,988 | A | | 11/1971 | Zurmuehlen |
| 3,726,545 | A | | 4/1973 | Grim et al. |
| 3,902,745 | A | * | 9/1975 | Mooney .................. F16L 33/24 |
| | | | | 285/247 |
| 3,954,289 | A | | 5/1976 | Martin, Sr. |
| 3,964,772 | A | * | 6/1976 | Cox, Jr. .................. F16L 33/01 |
| | | | | 285/39 |
| 4,058,329 | A | | 11/1977 | Johansson |
| 4,123,093 | A | | 10/1978 | Newland |
| 4,509,778 | A | | 4/1985 | Arnoldt |
| 4,569,110 | A | | 2/1986 | Goettel |
| 4,930,815 | A | | 6/1990 | Tuggler, Jr. |
| 5,109,756 | A | | 5/1992 | Barboza et al. |
| 5,240,292 | A | | 8/1993 | Roszin |
| 5,411,299 | A | | 5/1995 | Wagner |
| 5,538,293 | A | | 7/1996 | Kolt |
| 5,564,756 | A | | 10/1996 | Hamilton |
| 5,653,482 | A | | 8/1997 | Ficchi, Jr. |
| 5,741,030 | A | | 4/1998 | Moore et al. |
| 6,196,597 | B1 | | 3/2001 | Karnes |
| 6,279,967 | B1 | | 8/2001 | Proctor et al. |
| 6,616,193 | B2 | | 9/2003 | Anderson |
| 6,866,308 | B2 | | 3/2005 | Issagholian-Havai |
| 7,338,095 | B1 | | 3/2008 | Karnes |
| 7,393,021 | B1 | | 7/2008 | Lukjan |
| 7,708,034 | B2 | | 5/2010 | Gudenburr et al. |
| 7,992,903 | B1 | | 8/2011 | Desimone |
| 8,178,197 | B2 | | 5/2012 | Segur |
| 8,486,525 | B2 | | 7/2013 | Segur |
| 2002/0124614 | A1 | | 9/2002 | Hermanson |
| 2010/0201116 | A1 | | 8/2010 | Kipker et al. |
| 2014/0049043 | A1 | | 2/2014 | Hamman, Jr. et al. |
| 2015/0010372 | A1 | | 1/2015 | Herrema |
| 2015/0099454 | A1 | | 4/2015 | Hikmet |

FOREIGN PATENT DOCUMENTS

| | | | | |
|---|---|---|---|---|
| DE | 19936224 | A1 | * 3/2001 | ............. F16L 33/24 |
| DE | 202013100860 | U1 | * 3/2013 | ............. F16L 41/08 |
| EP | 1995531 | | 11/2008 | |
| GB | 138973 | A | * 2/1920 | ............. F16L 41/14 |

OTHER PUBLICATIONS

Crown Products Company, Inc. Residential and Commercial Air Duct Products, Catalog No. 25, Apr. 2011, 30 pgs.

* cited by examiner

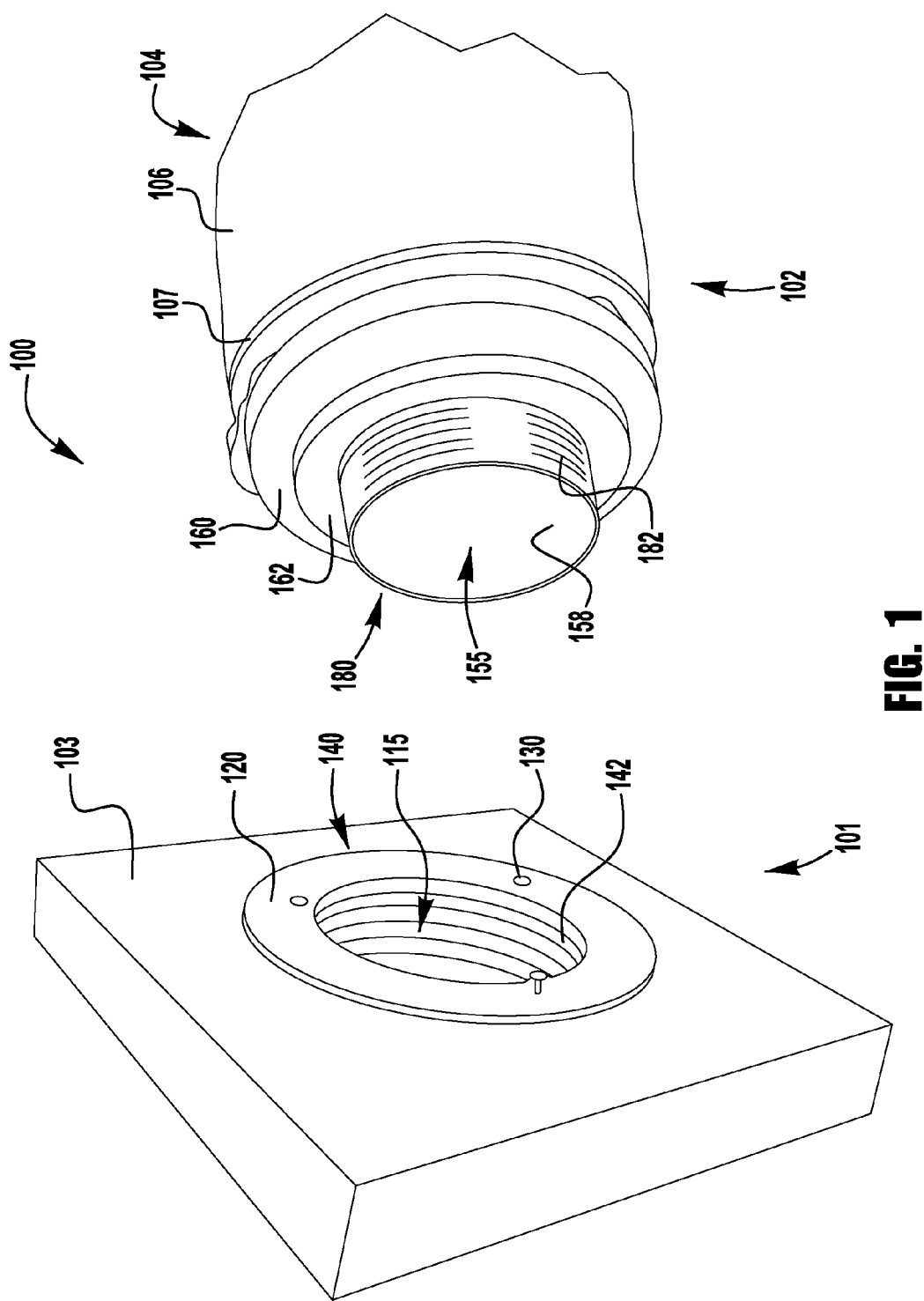

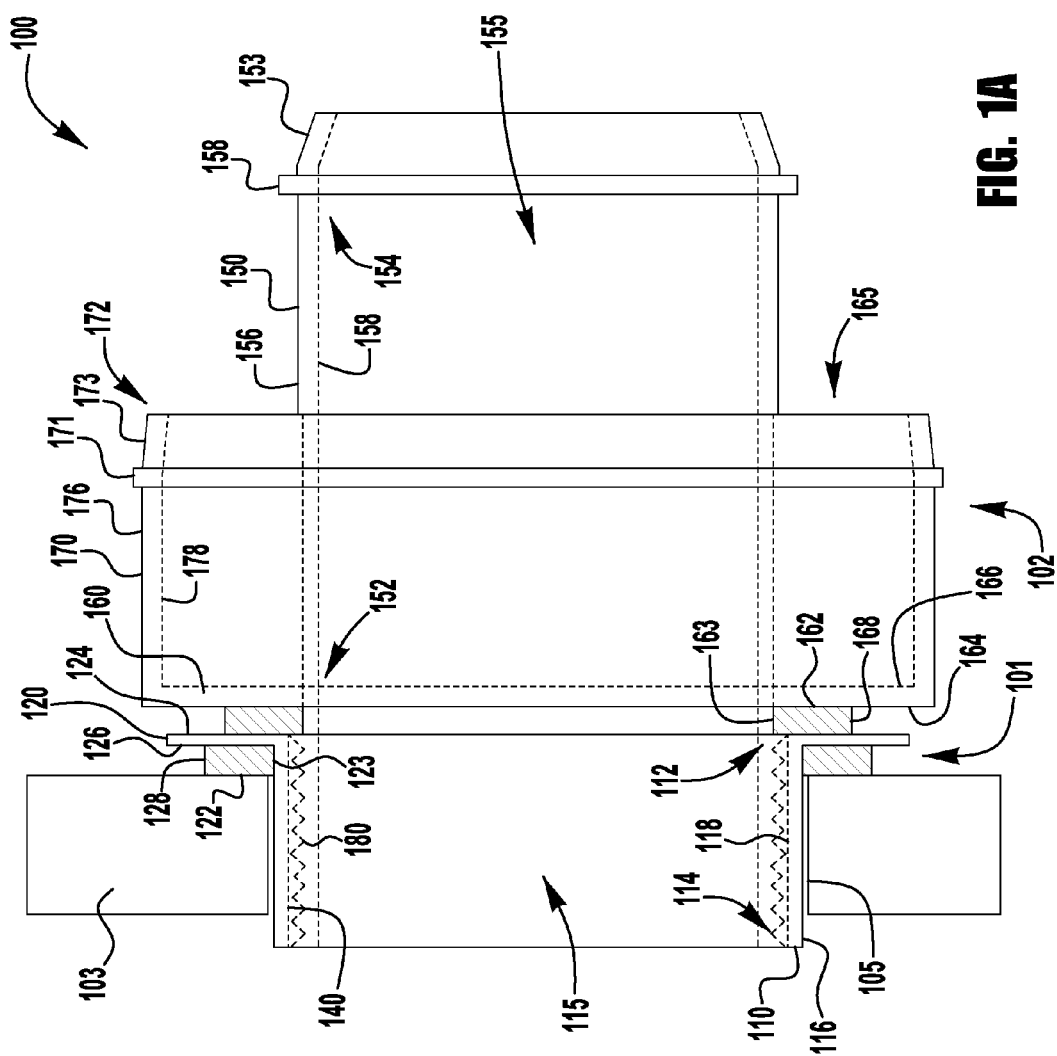

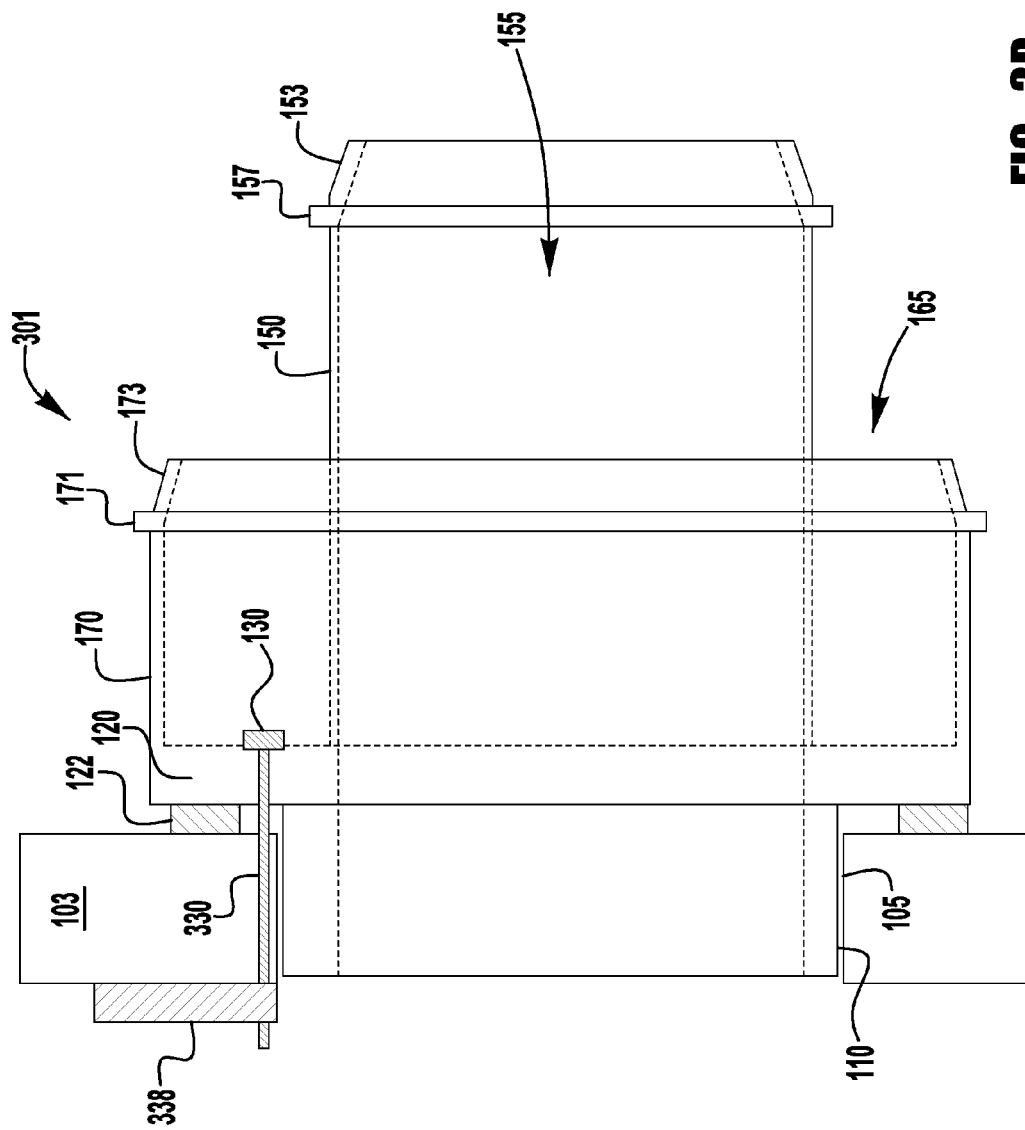

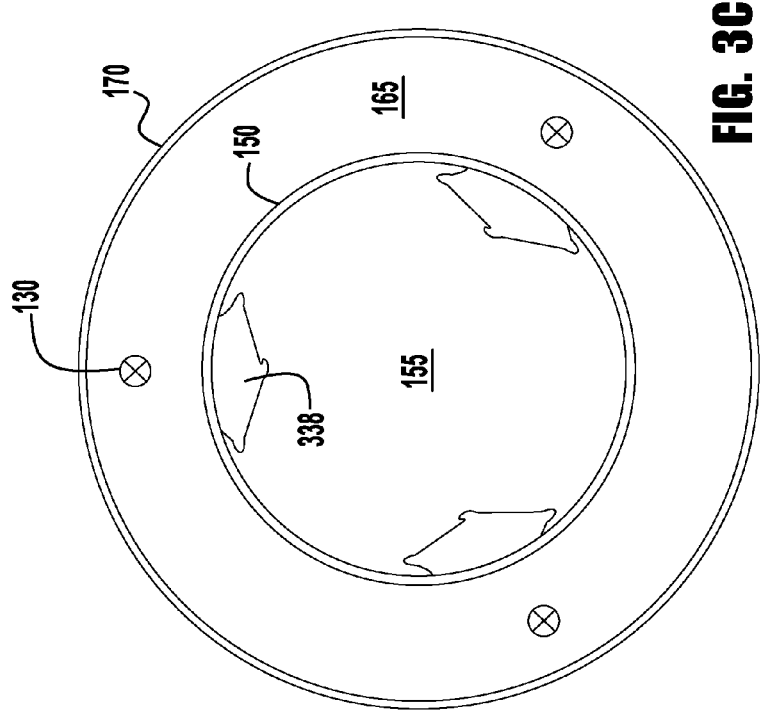
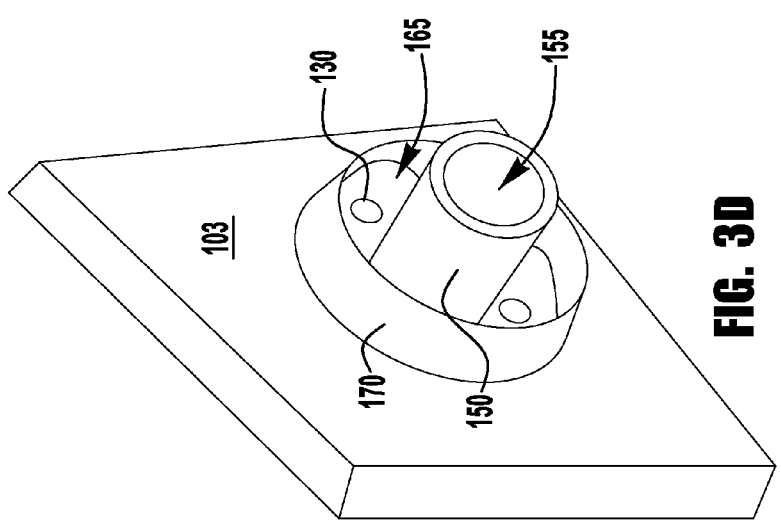

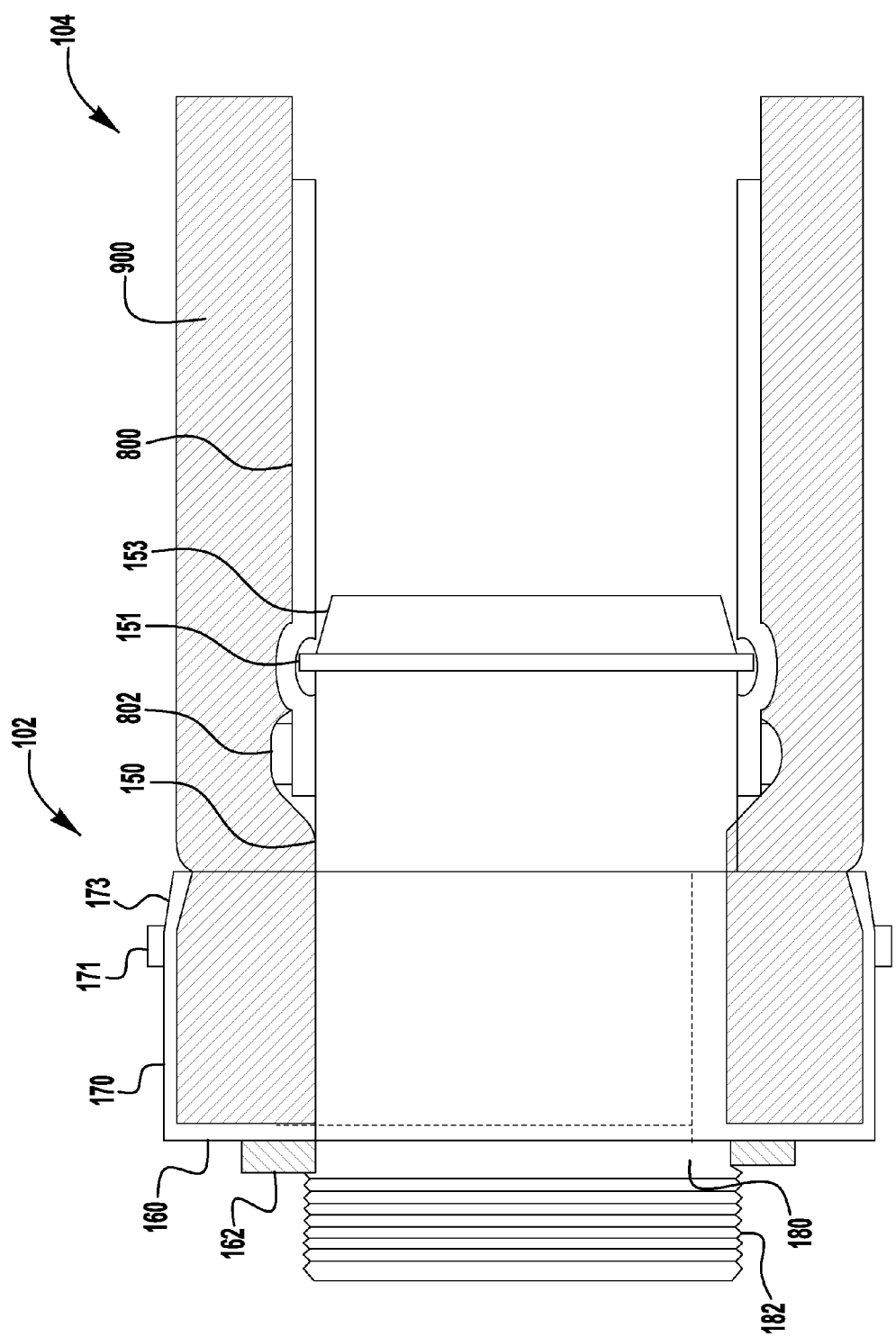

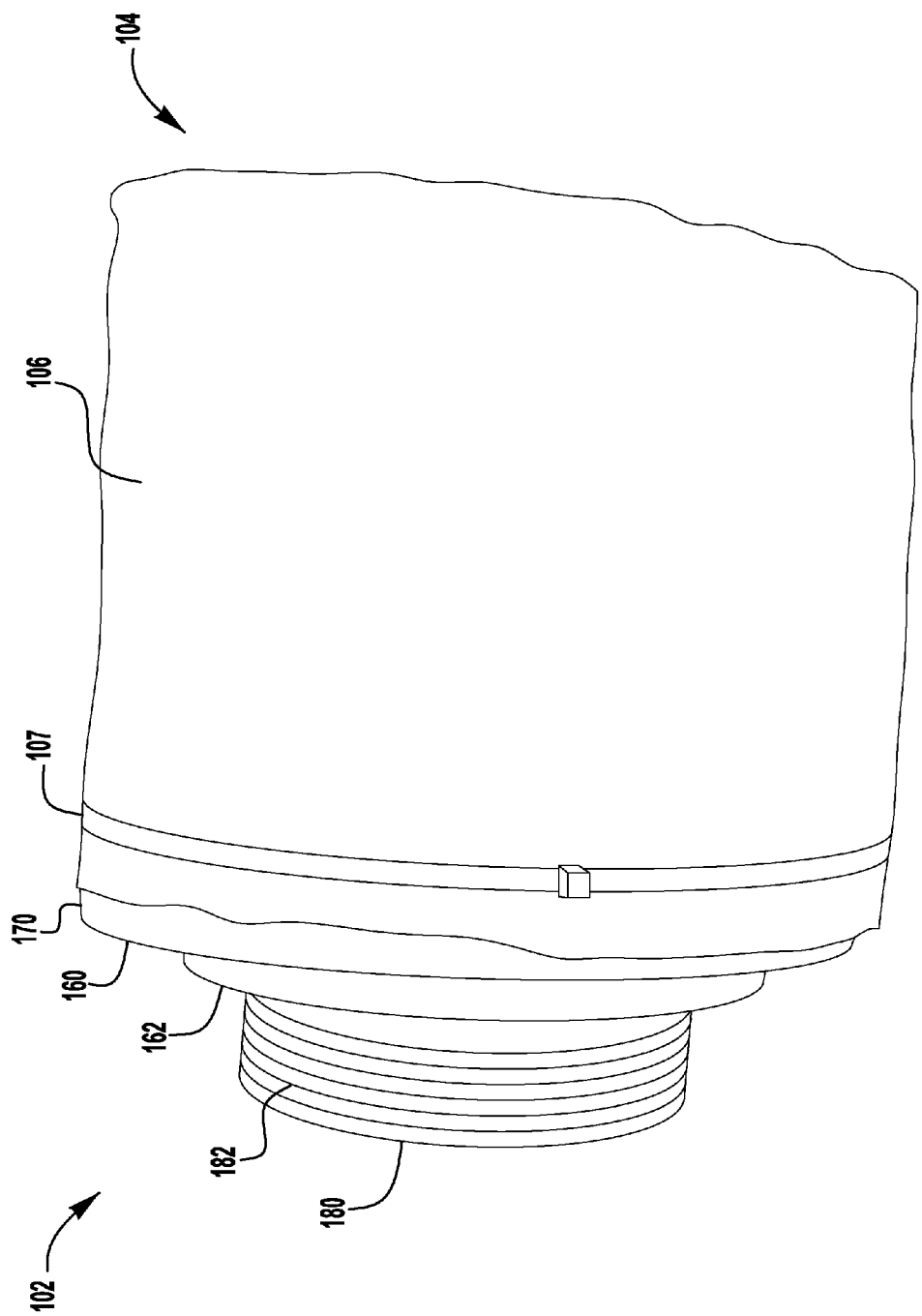

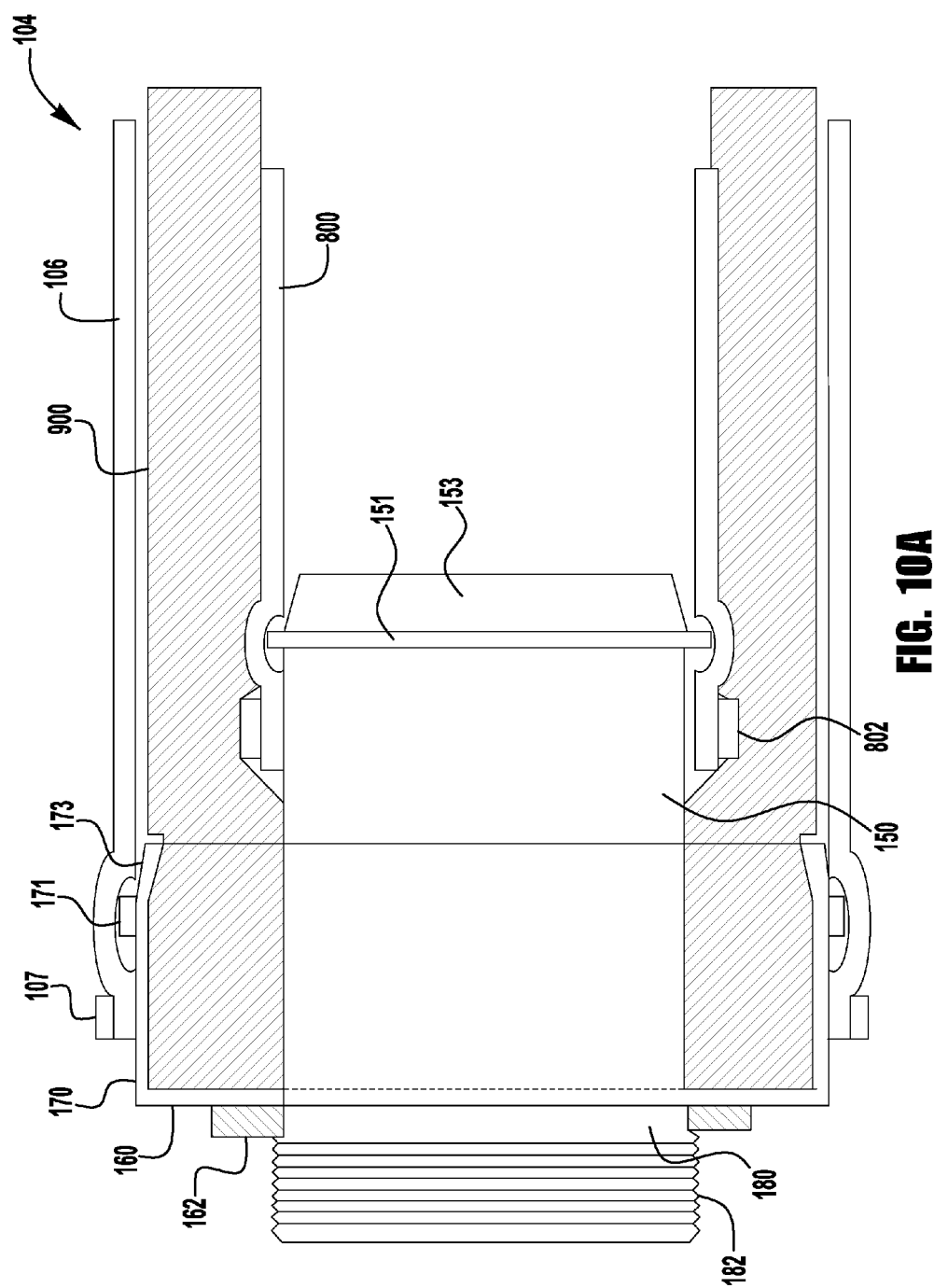

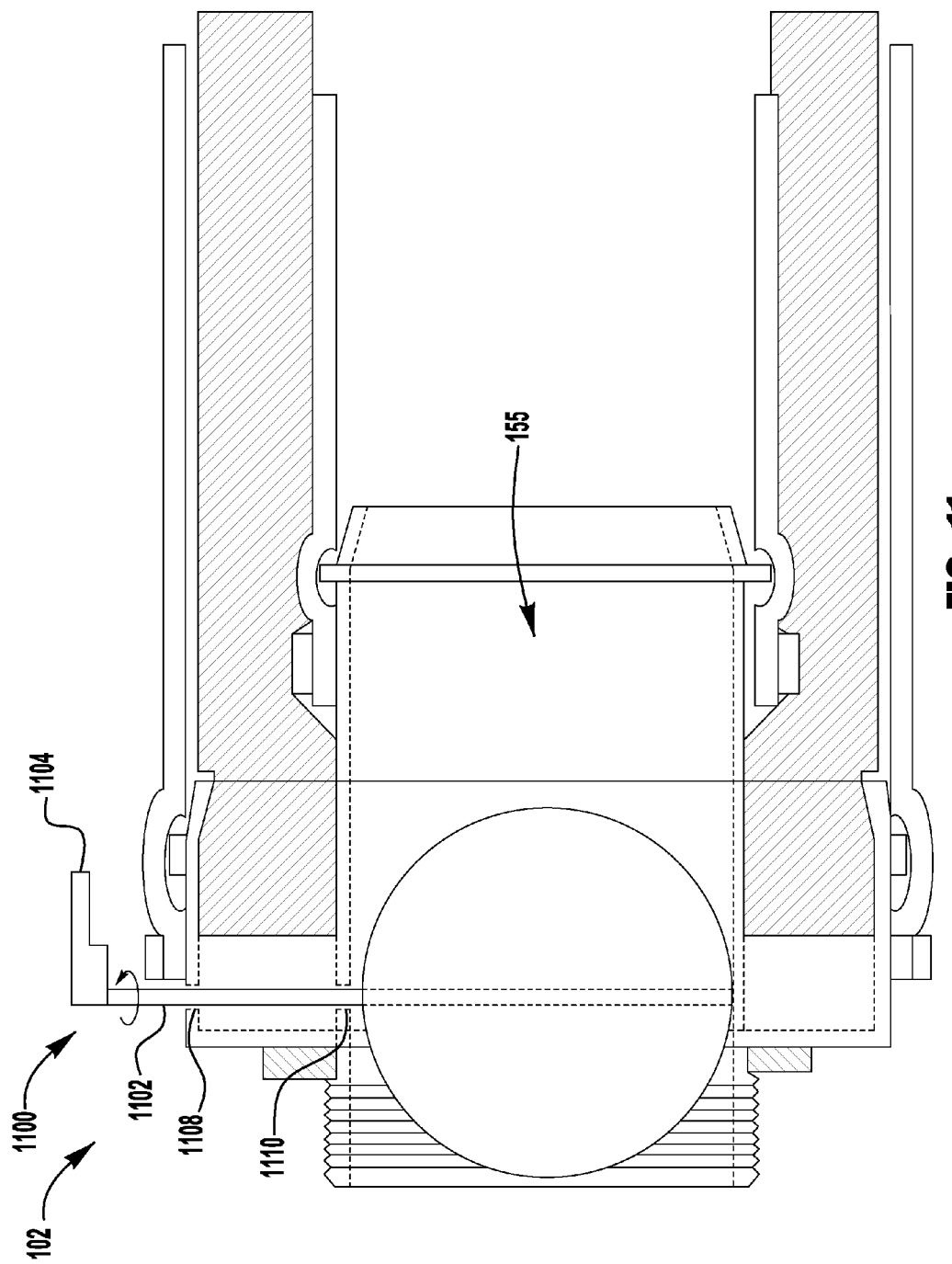

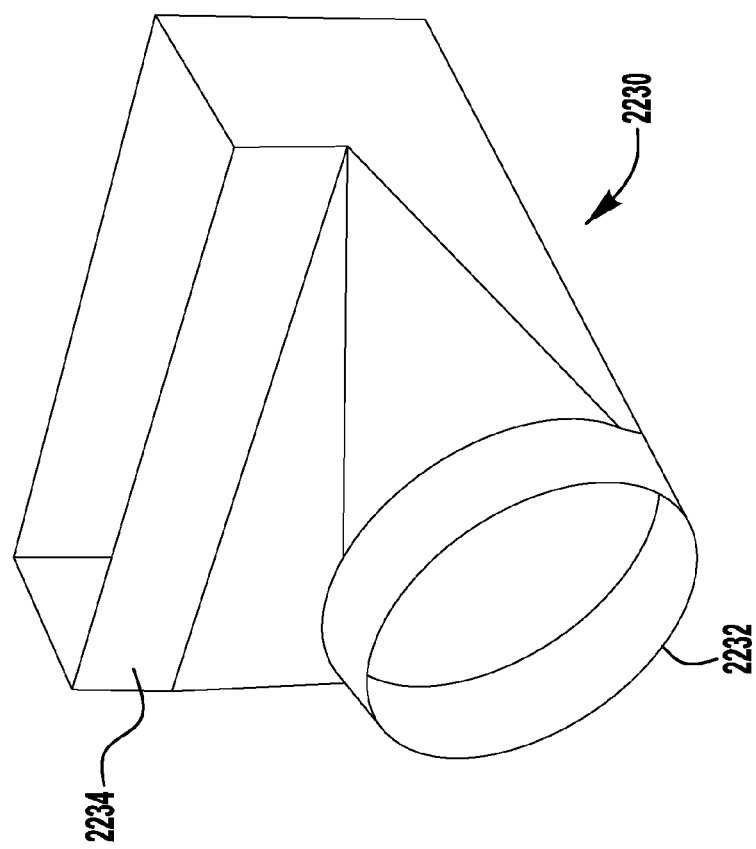
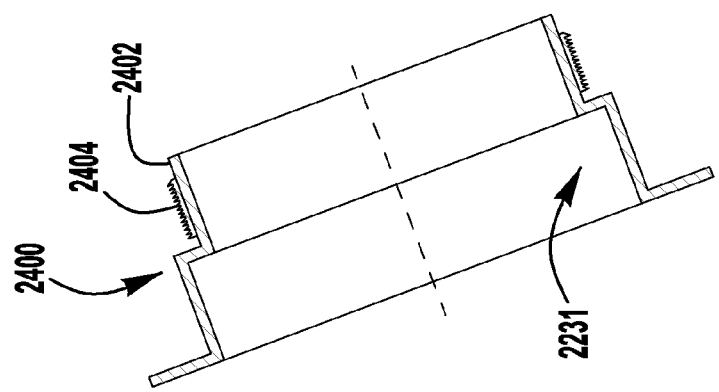
FIG. 24

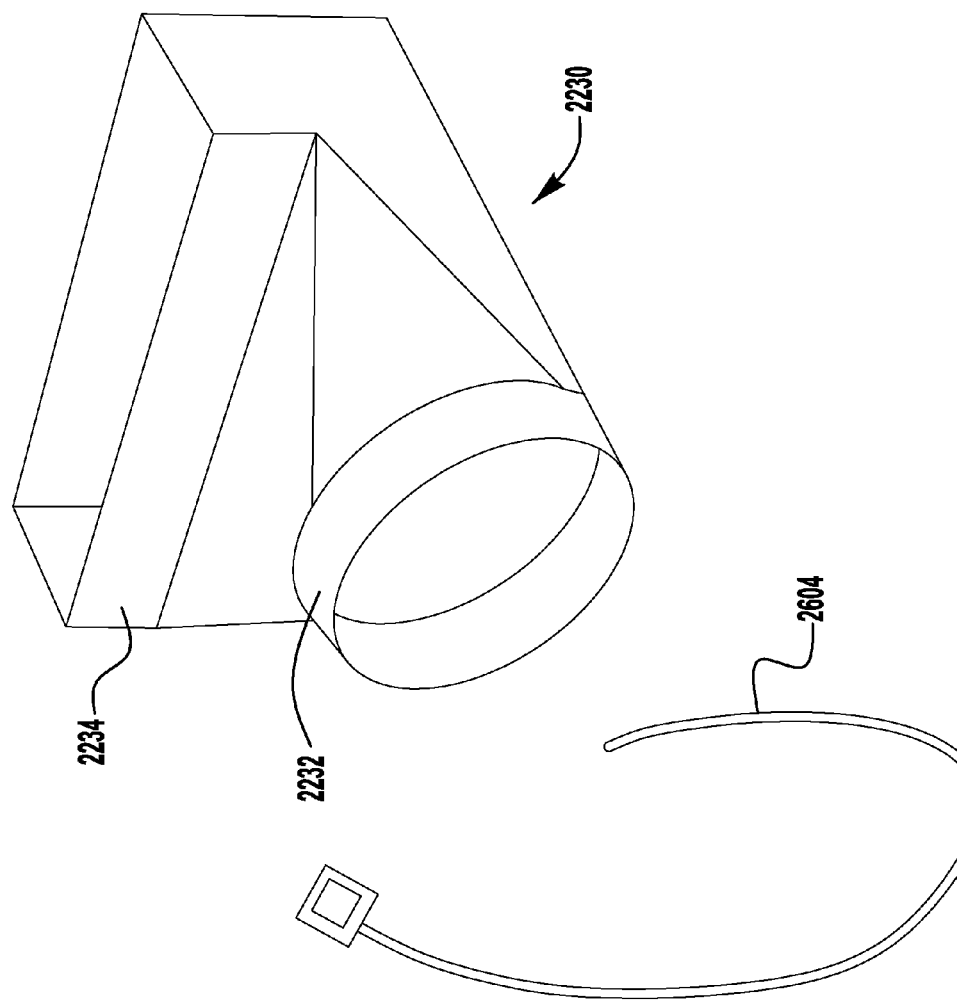
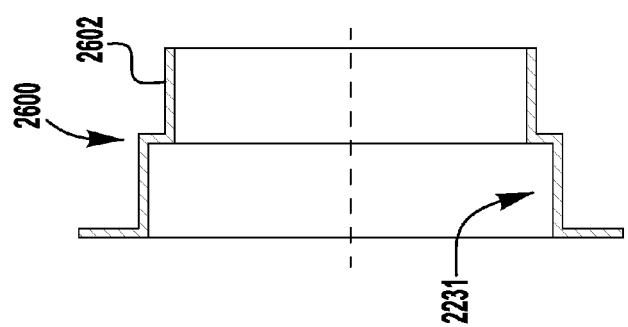
FIG. 26

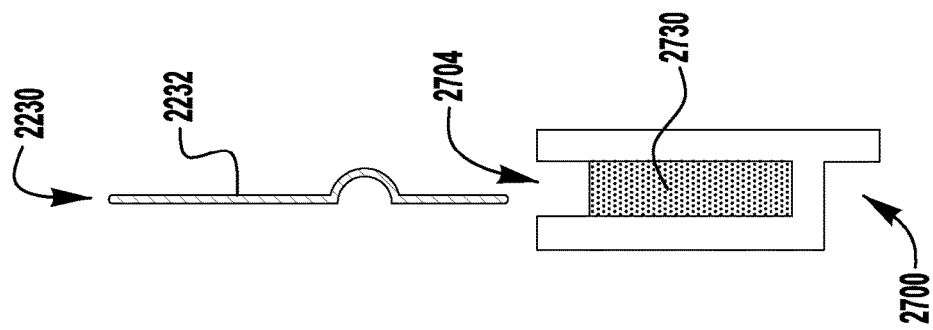
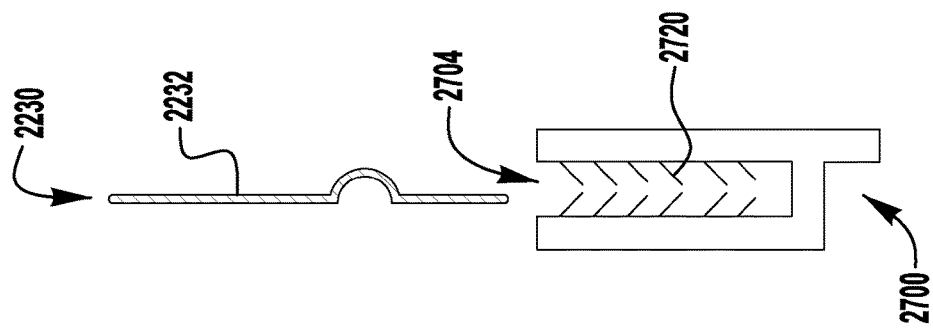
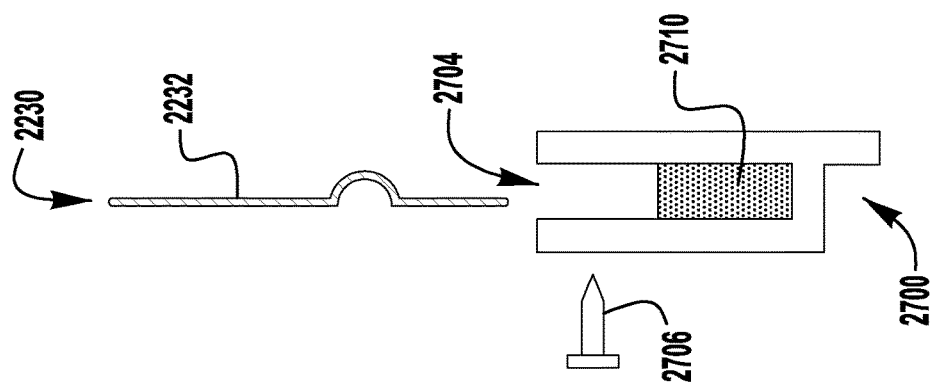

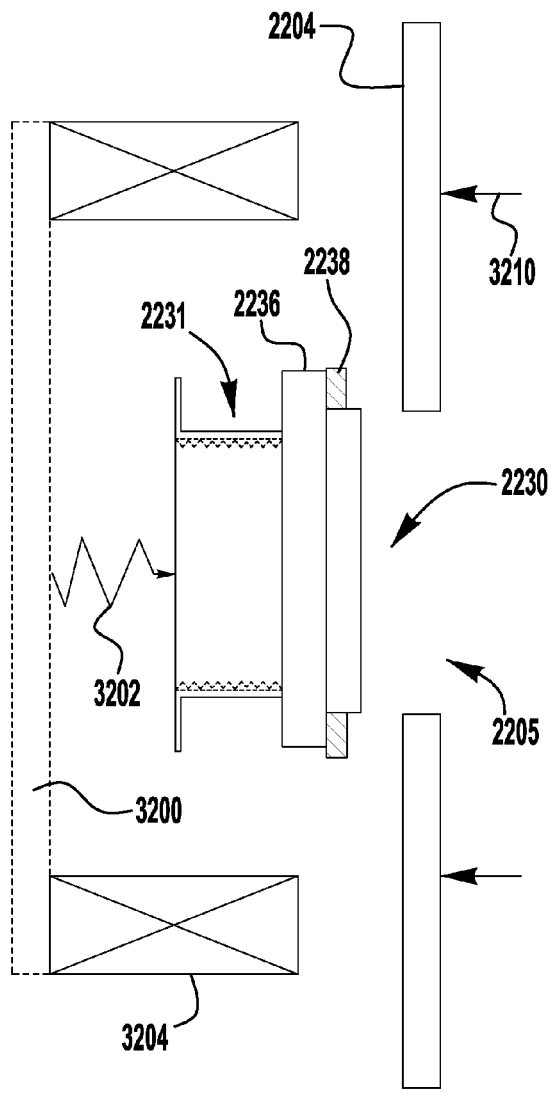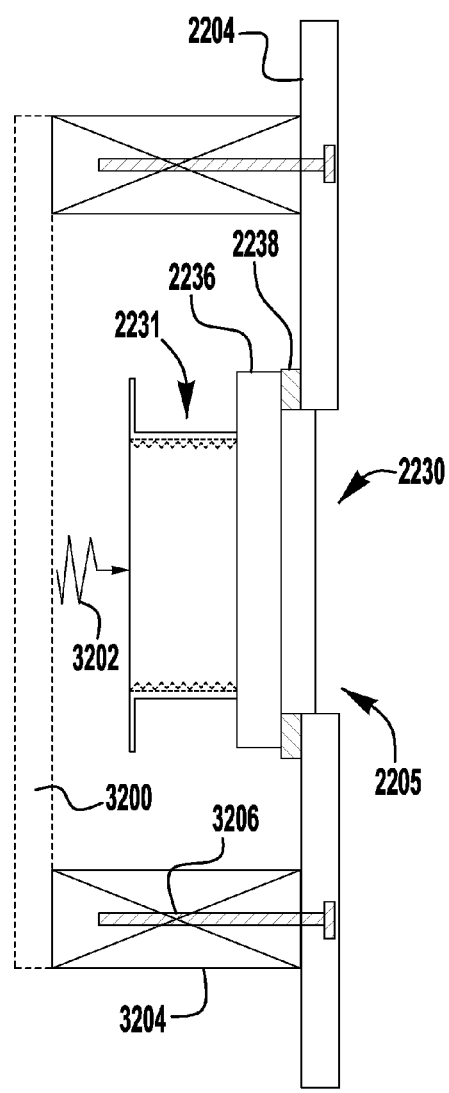
FIG. 32  FIG. 32A

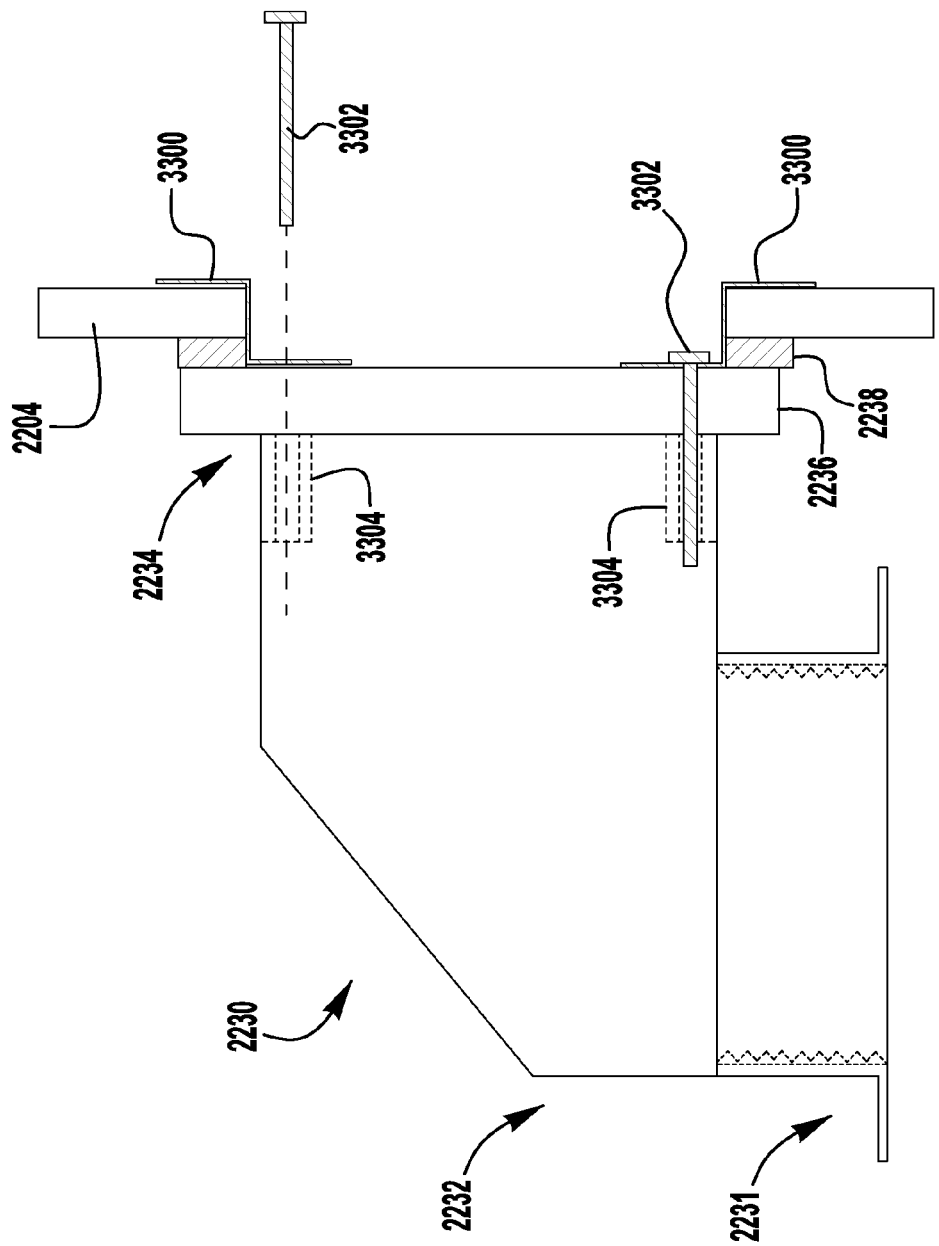

FLEX DUCT CONNECTION SYSTEM

RELATED APPLICATIONS

This application claims priority to and the benefit of U.S. Provisional Patent Application Nos. 62/132,628, filed on Mar. 13, 2015, and 62/168,979, filed on Jun. 1, 2015, which are both incorporated herein by reference in their entirety.

TECHNICAL FIELD

The present invention relates to ducts, duct connectors, and duct connection systems. More particularly, a duct connection system that provides for reliable and quickly made connections between rigid and/or flexible ducts.

BACKGROUND OF THE INVENTION

Ducts and conduits are used to convey air in building heating, ventilation, and air conditioning (HVAC) systems. Typically the ducts in a residential building or home are arranged in a trunk and branch configuration. A plenum or trunk conveys air from an air handler of a HVAC system through various ducts and distribution boxes to smaller branch ducts that carry air to individual rooms of the home.

Many ducts, particularly trunk ducts and plenums, are formed of sheet metal and are rigid. Rigid ducts can be made from a wide variety of materials, such as, for example, sheet metal, duct board, foam board, or any other suitably rigid material. Larger ducts and distribution boxes may be formed of duct board, a rigid insulating material formed of an insulation layer and a reinforcing layer. Branch ducts may be rigid sheet metal ducts or flexible ducts. Flexible ducts are typically formed of a wire-reinforced core, an insulation layer, and an outer sheath. Ducts may terminate at duct boots that connect the ducts to air registers arranged in the floor, walls, or ceiling of a room.

These ducts and distribution boxes may be located in conditioned or unconditioned portions of the building. Leaks from connections between ducts in unconditioned spaces of a home, such as the attic, contribute to energy loss from the HVAC system because conditioned air is leaked into an unconditioned space, rather than being conveyed to the conditioned rooms of the building.

Existing methods of connecting flexible ducts to rigid ducts made of stainless or galvanized steel or duct board include sheet metal screws, mastic, adhesive tape, and plastic ties. These methods may be used on their own or in concert to connect ducts together. Mastic is a non-hardening adhesive compound that may be used on its own or with a reinforcing material such as fiberglass mesh tape.

SUMMARY

Exemplary embodiments of ducts, duct connectors, and duct connection systems are disclosed herein.

In one exemplary embodiment, a duct system includes a rigid duct, a first duct connector connected to the rigid duct, a first sealing member disposed between the rigid duct and the first duct connector, a flexible duct, a second duct connector connected to the flexible duct, and a second sealing member disposed between the first duct connector and the second duct connector. The first duct connector is assembled to the second duct connector to compress the second sealing member and form a seal between the first duct connector and the second duct connector and thereby form a seal between the rigid duct and the flexible duct.

BRIEF DESCRIPTION OF THE DRAWINGS

These and other features and advantages of the present invention will become better understood with regard to the following description and accompanying drawings in which:

FIG. 1 is a perspective view of an exemplary duct connection system;

FIG. 1A is a cross-sectional view of the exemplary duct connector of FIG. 1 in an assembled condition;

FIG. 3B is a cross-sectional view of an exemplary single-piece duct connector assembled to duct board;

FIG. 3C is a front view of the exemplary duct connector of FIG. 3B;

FIG. 3D is a perspective view of the exemplary duct connector of FIG. 3B assembled to duct board;

FIG. 9A is a cross-sectional view of the exemplary duct connector, core tube, and insulation layer of FIG. 9;

FIG. 10 is a perspective view of an exemplary duct connector, core tube, and insulation layer of FIG. 9, wrapped with an insulating sheath;

FIG. 10A is a cross-sectional view of the exemplary duct connector, core tube, insulation layer, and insulating sheath of FIG. 10;

FIG. 11 is a cross-sectional view of the exemplary duct connector of FIG. 10 with a damper;

FIG. 23A is an illustration of a profile of an exemplary gasket of the duct adapter of FIG. 23;

FIG. 23B is an illustration of a profile of an exemplary gasket of the duct adapter of FIG. 23;

FIG. 24 is a cross-sectional view of an exemplary duct adaptor;

FIG. 26 is a cross-sectional view of an exemplary duct adaptor;

FIG. 27A is an illustration of the profile of an exemplary groove of the duct adapter of FIG. 27;

FIG. 27B is an illustration of the profile of an exemplary groove of the duct adapter of FIG. 27;

FIG. 27C is an illustration of the profile of an exemplary groove of the duct adapter of FIG. 27;

FIG. 32 is a cross-sectional view of an exemplary duct boot retention system in a disassembled condition;

FIG. 32A is a cross-sectional view of the exemplary duct boot retention system of FIG. 32 in an assembled condition;

FIG. 33A is a cross-sectional view of an exemplary duct boot retention system that is similar to the system of FIG. 33.

DETAILED DESCRIPTION

Figure 1B:
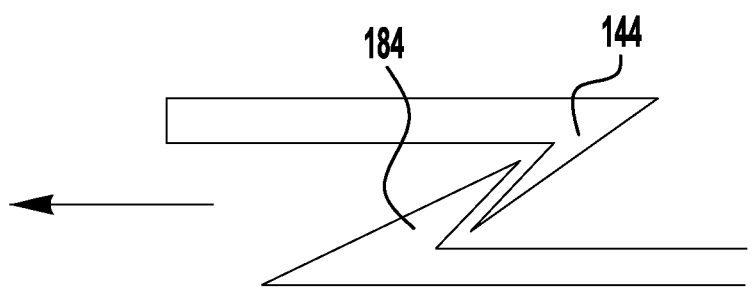
FIG. 1B is an illustration of the profile of an exemplary pair of interlocking annular ridges of the mating surfaces of the duct connectors of FIGS. 1 and 1A.

Prior to discussing the various embodiments, a review of the definitions of some exemplary terms used throughout the disclosure is appropriate. Both singular and plural forms of all terms fall within each meaning.

As described herein, when one or more components are described as being connected, joined, affixed, coupled, attached, or otherwise interconnected, such interconnection may be direct as between the components or may be indirect such as through the use of one or more intermediary components. Also as described herein, reference to a "member," "component," or "portion" shall not be limited to a single structural member, component, or element but can include an assembly of components, members or elements. "Physical communication" as used herein, includes but is not limited to connecting, affixing, joining, attaching, fixing, fastening, placing in contact two or more components, elements, assemblies, portions or parts. Physical communication between two or more components, etc., can be direct or indirect such as through the use of one or more intermediary components and may be intermittent or continuous.

In the embodiments discussed herein, the connector arrangements of the present application are described for use with ducts. However, the connector arrangements of the present application may be used in a variety of different applications. The present patent application specification and drawings provide multiple embodiments of connector arrangements and duct connector assemblies. Any feature or combination of features from each of the embodiments may be used with features or combinations of features of other embodiments.

FIGS. 1 and 1A illustrate an exemplary embodiment of a duct connection system 100 for connecting flexible ducts to rigid ducts and plenums in a residential building HVAC system. The illustrated duct connection system 100 includes a first duct connector 101 and a second duct connector 102. The illustrated duct connectors 101, 102 are generally round in shape, though they may be any shape appropriate for connection to flexible ducts. In the illustrated embodiment, the first duct connector 101 is a female connector and the second duct connector 102 is a male connector. In another embodiment, the first duct connector is a male connector, and the second duct connector is a female connector.

Though the illustrated embodiment of FIGS. 1 and 1A shows a connection system for connecting a flexible duct to rigid duct, the connection system may be used to connect two flexible duct segments, or two ducts that are rigid. Flexible duct segments could also be sold in various pre-cut lengths with connectors pre-assembled to each end. Similarly, pre-made fittings could include the duct connectors of the duct connection system of the present invention to allow for easier assembly and installation of a flexible duct system in a residential structure.

The first duct connector 101 is shown inserted into an opening 105 in a piece of duct board 103. The first duct connector 101 includes a central tube 110, a flange 120, a flange sealing member 122, one or more securing members 130, and a mating portion 140. The central tube 110 has a first end 112, a second end 114, an outer surface 116, and an inner surface 118. The flange 120 is rigidly connected to the first end 112 of the tube portion 110 and includes a front surface 124 and a back surface 126. The mating portion 140 of the first duct connector 101 comprises a female connection and is disposed on the inner surface 118 of the central tube 110 of the connector 100. The central tube 110 surrounds an interior 115 of the first duct connector 101 through which air flows. The one or more securing members 130 are disposed within the flange portion 120 of the first duct connector 101 and are used to secure the first duct connector 101 to the duct board 103. The securing members 130 may be any type of securing member, such as, for example, a threaded fastener, a rivet, a deployable fastener, an expanding anchor, or the like. As shown in FIGS. 3-7, the securing members may also transition from an un-deployed to a deployed position to secure the first duct connector to a portion of duct board.

The flange sealing member 122 provides an air-tight seal between the duct board 103 and first duct connector 101. The flange sealing member 122 has an outer profile 128 that is larger than the opening 105 in the duct board 103 for the first duct connector 101, and an opening 123 that is larger than the outer surface 116 of the central tube 110 of the first duct connector 101. A seal is created between the flange sealing member 122 and the duct board 103, and between the flange sealing member 122 and the back side 126 of the flange 120 of the first duct connector 101. The flange sealing member 122 may be attached to the duct board 103, the first duct connector 101, or both components, by any connecting means, such as, for example, an adhesive connection, a threaded connection, a fastener connection, or the like. The flange sealing member 122 may also be compressed between the flange 120 and the duct board 103.

The second duct connector 102 is shown assembled to a segment of flexible duct 104 in FIG. 1, and is shown without flexible duct in FIG. 1A. The second duct connector 102 includes a central tube 150, a flange 160, a connection sealing member 162, a collar 170, and a mating portion 180. The central tube 150 has a first end 152, a second end 154, an outer surface 156, and an inner surface 158. The second end 154 of the central tube 150 is tapered 153 to receive a core tube of the flexible duct 104. The central tube 150 surrounds an interior 155 of the second connector 102 through which air flows. A fastener (not shown) and an annular ridge 151 located on the outer surface 156 of the tube 150 prevents the reinforced core (not shown) of a flexible duct 104 from sliding off the central tube 150 of the second duct connector 102 during installation and use.

The flange 160 is rigidly connected to the first end 152 of the central tube 150 and includes a front surface 164 and a back surface 166. The collar 170 extends from the back surface 166 of the flange 160 to its end 172. The collar 170 has an inner surface 176 and an outer surface 178. The end 172 of the collar 170 is tapered 173 to receive an outer sheath 106 of a flexible duct 104. A fastener 107 is secured around the outer sheath 106 behind and an annular ridge 171 on the outer surface 176 of the collar 170 prevents the outer sheath 106 of a flexible duct 104 from sliding off the collar 170 of the second duct connector 102 during installation and use. The radial gap 165 between the inner surface 178 of the collar 170 and the outer surface 156 of the central tube 150 receives an insulation layer (see FIGS. 9, 10) of the flexible duct 104. The mating portion 180 of the second duct connector 102 is located at the first end 152 of the central tube 150 and comprises a male connection.

Referring now to FIG. 1A, the connection sealing member 162 provides an air-tight seal between the first duct connector 101 and the second duct connector 102 when they are connected by their corresponding mating portions 140, 180. The connection sealing member 162 has an outer profile 168 that is larger than the inner surface 118 of the central tube 110 of the first duct connector 101, and an opening 163 that is larger than the mating portion 180 of the second connector 102. A seal is created between the connection sealing member 162 and the front sides 124, 164 of the flanges 120, 160 of the first and second duct connectors 101, 102 when they are connected by their mating portions 140, 180. When the first and second duct connectors 101, 102 are connected, air can flow freely through the interiors 115, 155 of the first and second connectors 101, 102.

The mating portions 140, 180 of the first and second duct connectors 101, 102 each have a mating surface 142, 182. In the illustrated embodiment, the mating surfaces 142, 182 of the first and second duct connectors each include one or more ridges 144, 184. When the male connector is inserted into the female connector, the ridges on an outer mating surface of the male connector engage with the ridges on the inner mating surface of the female connector, forming a secure connection. A cross-section of one pair of ridges 144, 184 is illustrated in FIG. 1B. As shown in FIG. 1B, the ridges are configured such that they slide past each other only in one direction. Any number of ridges may be included on the mating surfaces of the male and female connectors. Though the mating surfaces are shown with ridges, any type of locking connection between the mating surfaces may be used, such as, for example, a quarter turn connection, an adhesive connection, a threaded connection, a locking connection that has a locking and releasing position, or the like. Though the mating portions 140, 180 of the first and second duct connectors 101, 102 are shown with male and female connections, any means of connection can be used, such as, for example, a flange and fastener connection, a flange and clamp connection, a threaded collar connection, a snap-fit connection, or the like.

Figure 1C:
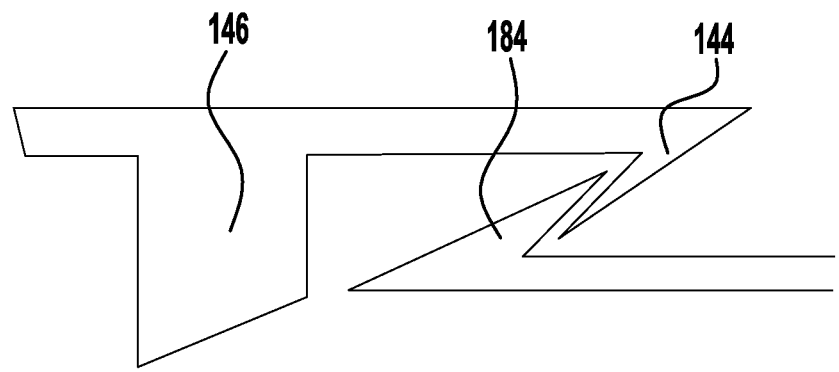
FIG. 1C is an illustration of the profile of an exemplary pair of interlocking annular ridges of the mating surfaces of the duct connectors of FIGS. 1 and 1A.

In another exemplary embodiment, shown in FIG. 1C, a releasing ridge 146 is included on one of the male or female mating surfaces such that the interlocking ridges 144, 184 release when the connectors are pressed together enough so that the locking ridges can separate. Though the decoupling mechanism shown is an annular ridge with a ramp-like profile, any decoupling means may be used, such as, for example, features on the mating surfaces that separate the hook-shaped ridges when the connection is twisted.

In another exemplary embodiment, the mating portions 140, 180 of the first and second duct connectors 101, 102 include a cam lock connection (not shown). To connect the first and second duct connectors 101, 102, the mating portions 140, 180 are pressed together and twisted until at least one pin on one mating portion is secured within a slot on the other mating portion. The connection sealing member 162 is sufficiently elastic to withstand being compressed when the cam lock connection is made, and to maintain an air tight seal after the cam lock mating portions are connected. The cam lock connection requires a small amount of turning to create a connection, such as, for example, less than ¼ of a turn, less than ⅛ of a turn, or another small amount.

Figure 2:
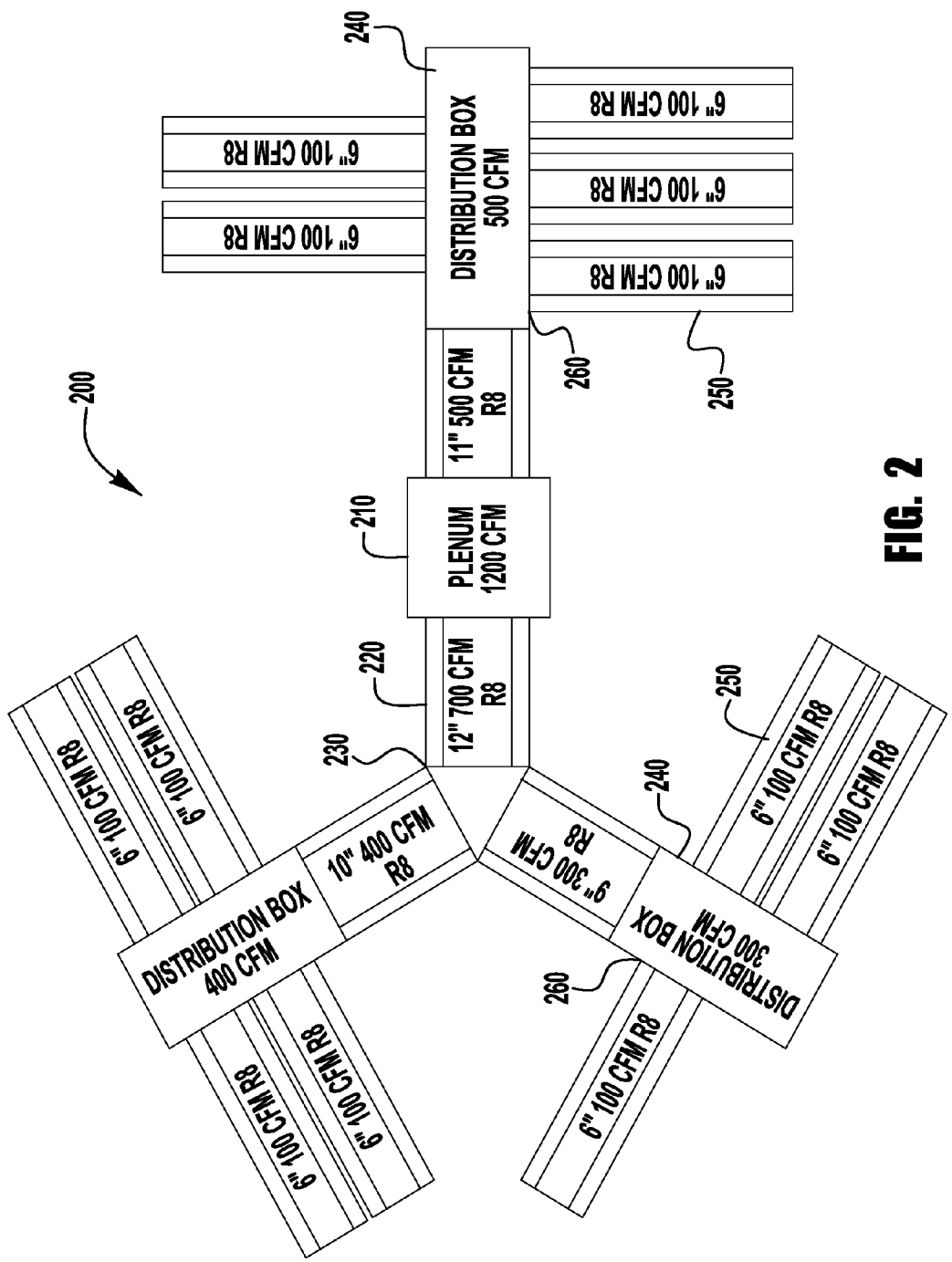
FIG. 2 schematically illustrates a duct system.

FIG. 2 is a schematic diagram of the trunk and branch layout of a heating, ventilation, and air conditioning (HVAC) system 200 typically found in a residential building. Air from an air handler (not shown) flows through a plenum 210 and then through intermediate ducts 220 and junction boxes 230 to distribution boxes 240 and then through branch ducts 250 that terminate in various rooms of a house. The branch ducts 250 in many cases are flexible ducts. The duct connection system illustrated in FIGS. 1 and 1A may be used in any connection 260 between a flexible branch duct 250 and a distribution box 240 or other rigid duct.

When assembling a flexible duct to a rigid distribution box 230, the installer will frequently have access only to the exterior of the distribution box, making it difficult to install any support structures on the interior of the distribution box to better secure a duct connector and flexible duct to the box. The securing members 130 of the first duct connector 101, on the other hand, can be deployed from the flange side of the connector. This allows an installer to secure the first duct connector to a distribution box without having to disassemble the box or reach inside through the opening created for the duct connector.

Figure 3:
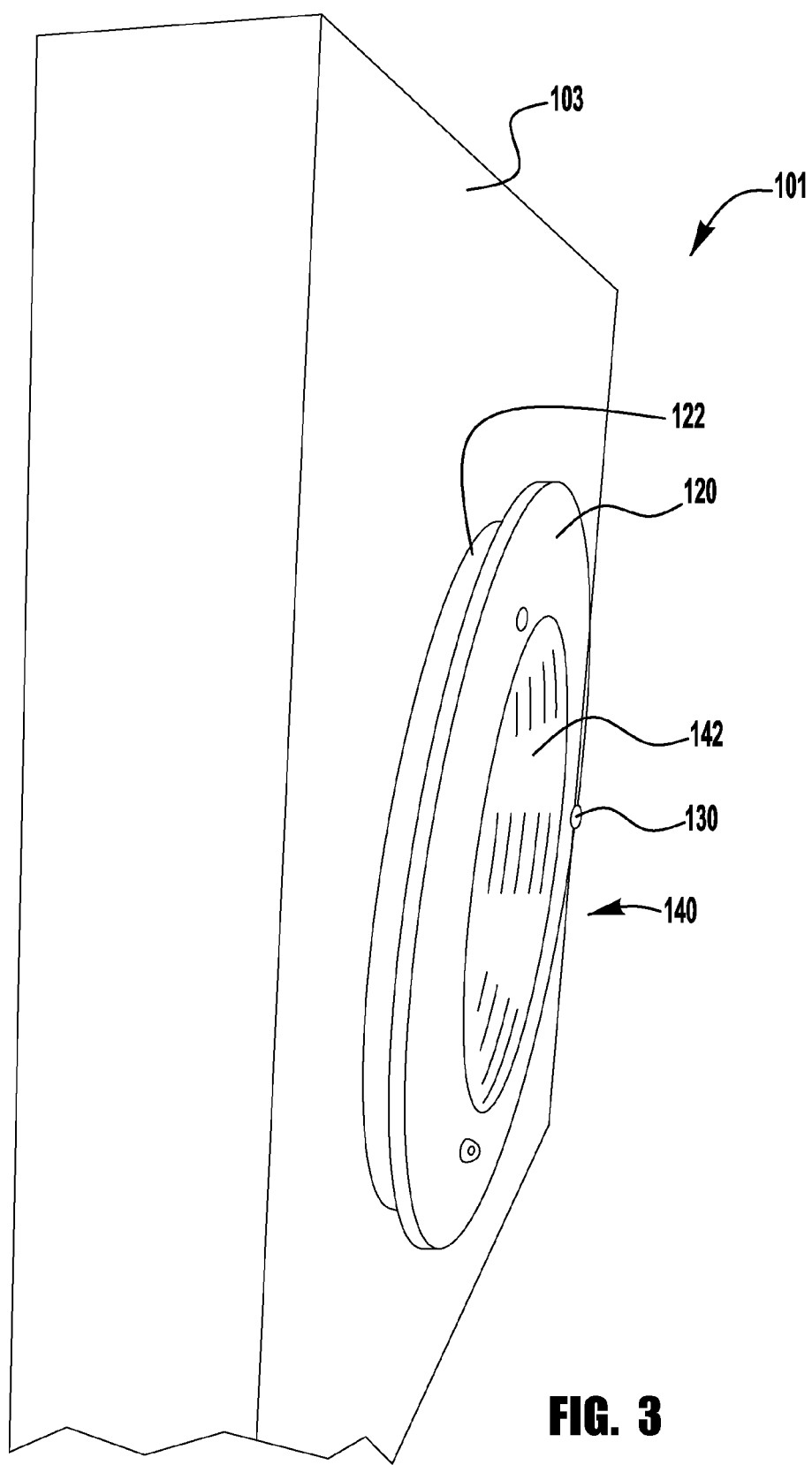
FIG. 3 is a perspective view of a female end of an exemplary duct connector assembled to duct board.
Figure 3A:
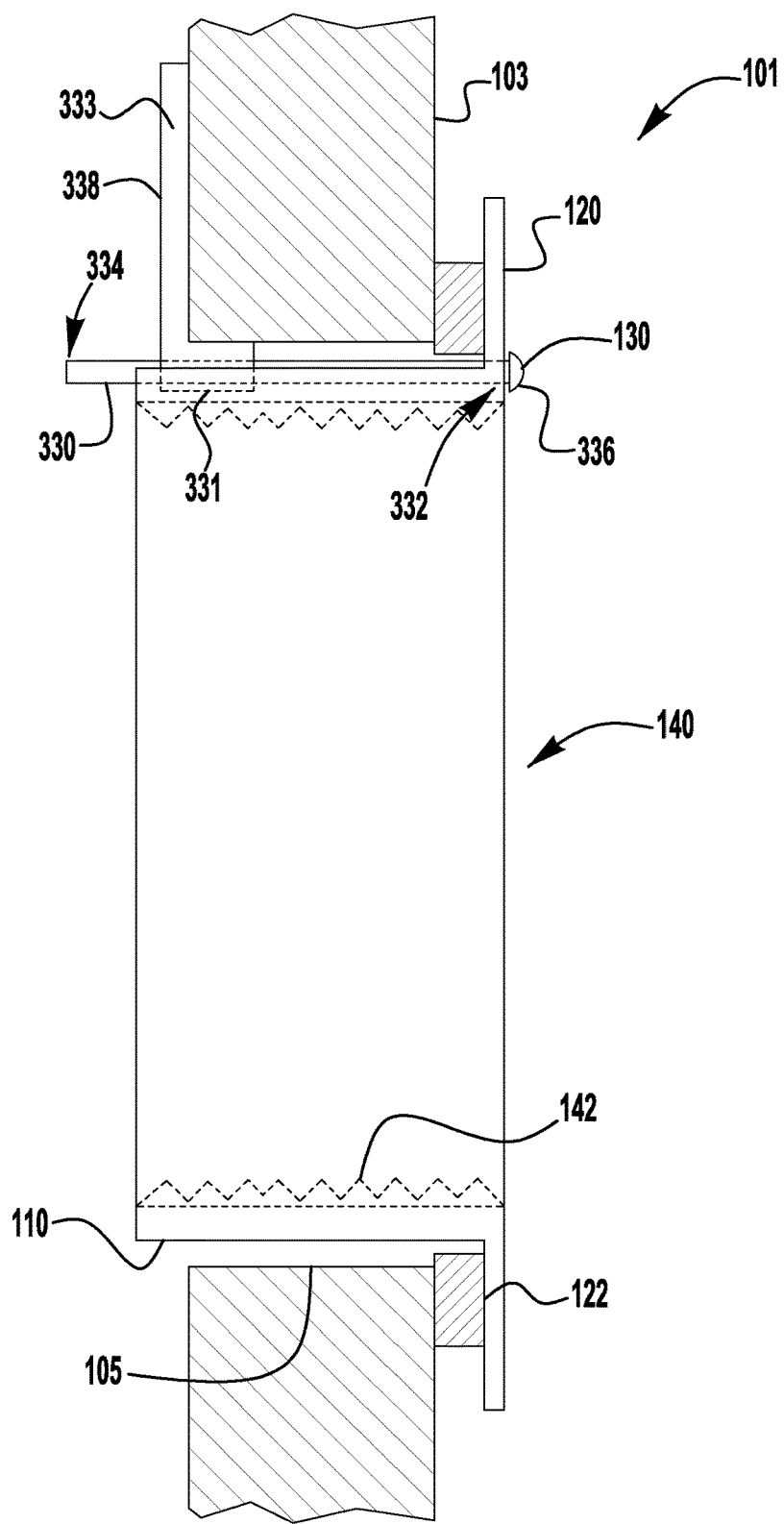
FIG. 3A is a cross-sectional view of the exemplary duct connector of FIG. 3.

Referring now to FIGS. 3 and 3A, the exemplary first duct connector 101 is shown installed in the duct board 103 in more detail. The securing members 130 shown in FIGS. 3 and 3A are moveable between an undeployed and deployed position. The first duct connector 101 of FIG. 3 includes three securing members, though any number of securing members may be used to assemble the first connector to duct board. Each securing member 130, as shown in FIG. 3A, includes a shaft 330 with a first end 332 and a second end 334, a head 336, and a tab member 338. Each tab member 338 has a paddle portion 333 that is rigidly attached to a base 331 that is moveably attached to the shaft 332 of a securing member 130. To hold the first duct connector 101 securely in the duct board opening 105, the securing members 130 pull the tab members 338 against the duct board 103, thereby compressing the flange sealing member 122 between the flange 120 and the duct board 103, forming an air-tight seal between the duct connector 101 and the duct board 103.

A securing force is the total force exerted by all tab members 338 on the duct board 103. An opposite and equivalent sealing force is exerted by the flange sealing member 122 on the duct board 103 when the tab members 338 are moved into their deployed position. A securing pressure is the force per unit area exerted by the tab members 338 on the duct board 103. A sealing pressure is the force per unit area exerted by the flange sealing member 122 on the duct board 103. Though the sealing and securing forces are equivalent, the sealing and securing pressures will differ based on the differences in surface area of the flange sealing member 122 and tab members 338. In one exemplary embodiment, the total area of the flange sealing members 338 (however many are included) is at least 10%, 20%, 30%, 40%, or 50% of the area of the opening 105 in the duct board 103. The flange sealing member 338 surface area is smaller, however, to provide enough sealing pressure between the flange sealing member 122 and the duct board 103 to prevent air leaks.

As noted above, each tab member 338 comprises a base 331 and a paddle 333. The base 331 moveably attaches the paddle 333 to the shaft 330 of a securing member 130 with a threaded connection, though any kind of moveable connection may be used. The paddle 333 operates to distribute the securing force over a larger surface area to reduce the securing pressure and thereby prevent crushing the duct board, which would be detrimental to the insulating ability of the duct board 103. Tab and securing members are distributed around the periphery of the duct connector central tube to provide an evenly distributed sealing force. Though the tab and securing members are shown as separate components, they may also be formed of a single component. Any number of tabs and securing members can be included.

In another exemplary embodiment, illustrated in FIGS. 3B, 3C, and 3D, a single-piece duct connector 301 is shown inserted into the opening 105 in the piece of duct board 103. The single-piece duct connector 301 incorporates the features of the first and second connectors 101, 102 in a single connector component. For example, the single-piece duct connector 301 assembles to the duct board 103 like the first connector 101, and to the flexible duct 103 like the second connector 102. Combining the first and second connectors 101, 102 into a single connector eliminates the need for or combines elements of the two separate connectors. For example, the single-piece connector 301 has only one flange 120 that combines the functions of the flange 120 of the first connector 101 and the flange 160 of the second connector 102. As another example, the mating portions 140, 180 and connection sealing member 162 are unnecessary in the single-piece connector 301. The single-piece connector 301 can be assembled first to the duct board 103 and then to the flexible duct 104.

FIGS. 4-7 illustrate the installation of an exemplary first duct connector 101 into an opening 105 in a piece of duct board 103. In the illustrated embodiment, the first duct connector with tab members in their undeployed position is inserted into an opening in a piece of duct board. The tab members are then moved into their deployed position by turning the securing members. Once the tab members have been rotated into their deployed position, further rotation of the securing members pulls the tab members toward the flange of the first duct connector, thereby coming into contact with the duct board. Further turning of the securing members applies pressure to the duct board between the tab members and the sealing member, forming a seal between the flange sealing member, the first duct connector, and the duct board.

Figure 4:
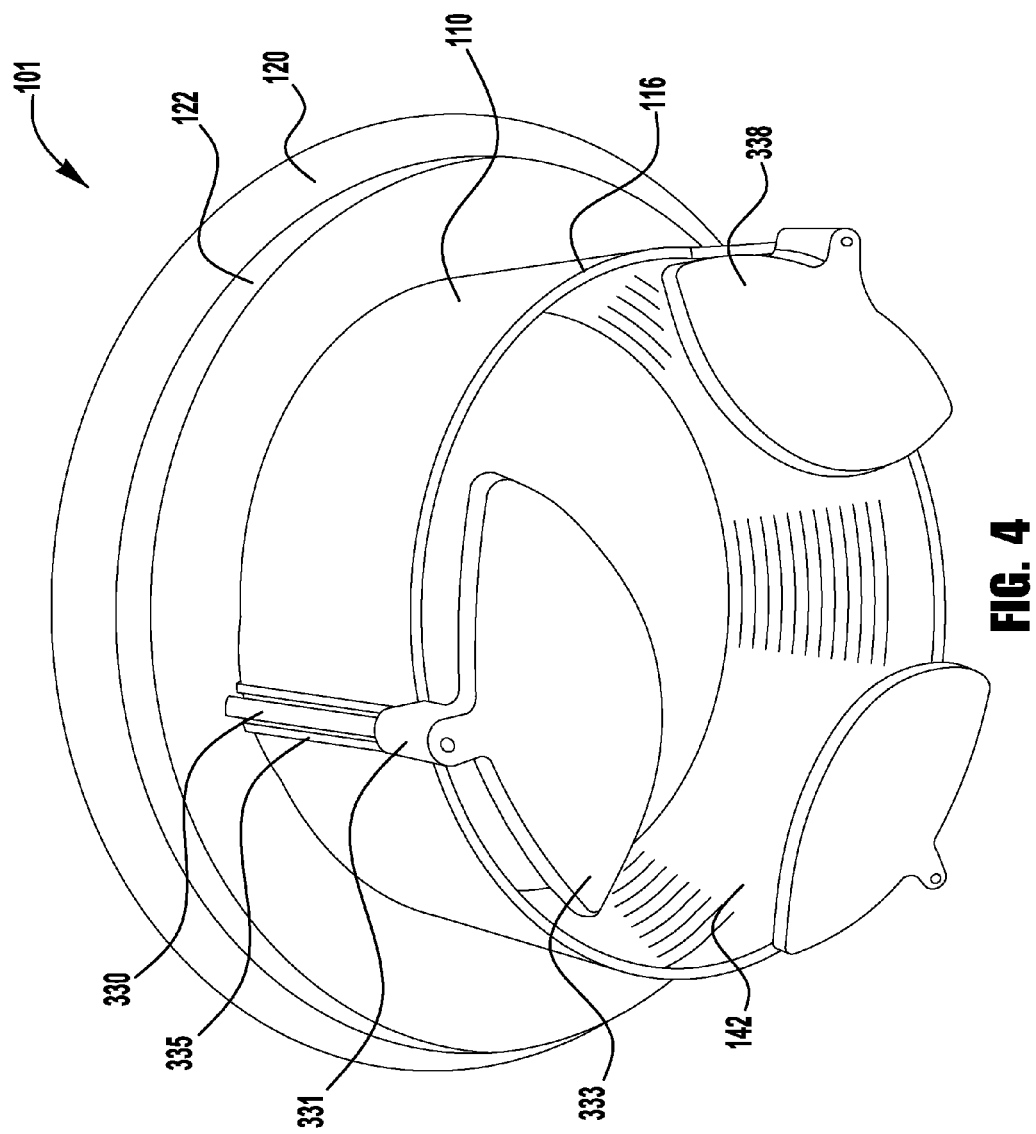
FIG. 4 is a perspective view of a female end of an exemplary duct connector.

Referring now to FIG. 4, the first duct connector 101 is shown with its tab members 338 in the undeployed position. As can be seen in FIG. 4, the shafts 330 of the securing members 130 extend along the outer surface 116 of the central tube 110 and are moveably held within a plurality of channels 335 in the outer surface 116 of the central tube 110. The channels 335 hold the securing members 130 in position during installation of the first duct connector 101 in the duct board 103. In the undeployed position, the tab members 338 are positioned such that they do not interfere with the opening 105 in the duct board 103 during installation of the connector 101. The opening 105 in the duct board 103 is larger than the central tube 110, but not larger than the opening 123 in the flange sealing member 122.

Figure 5:
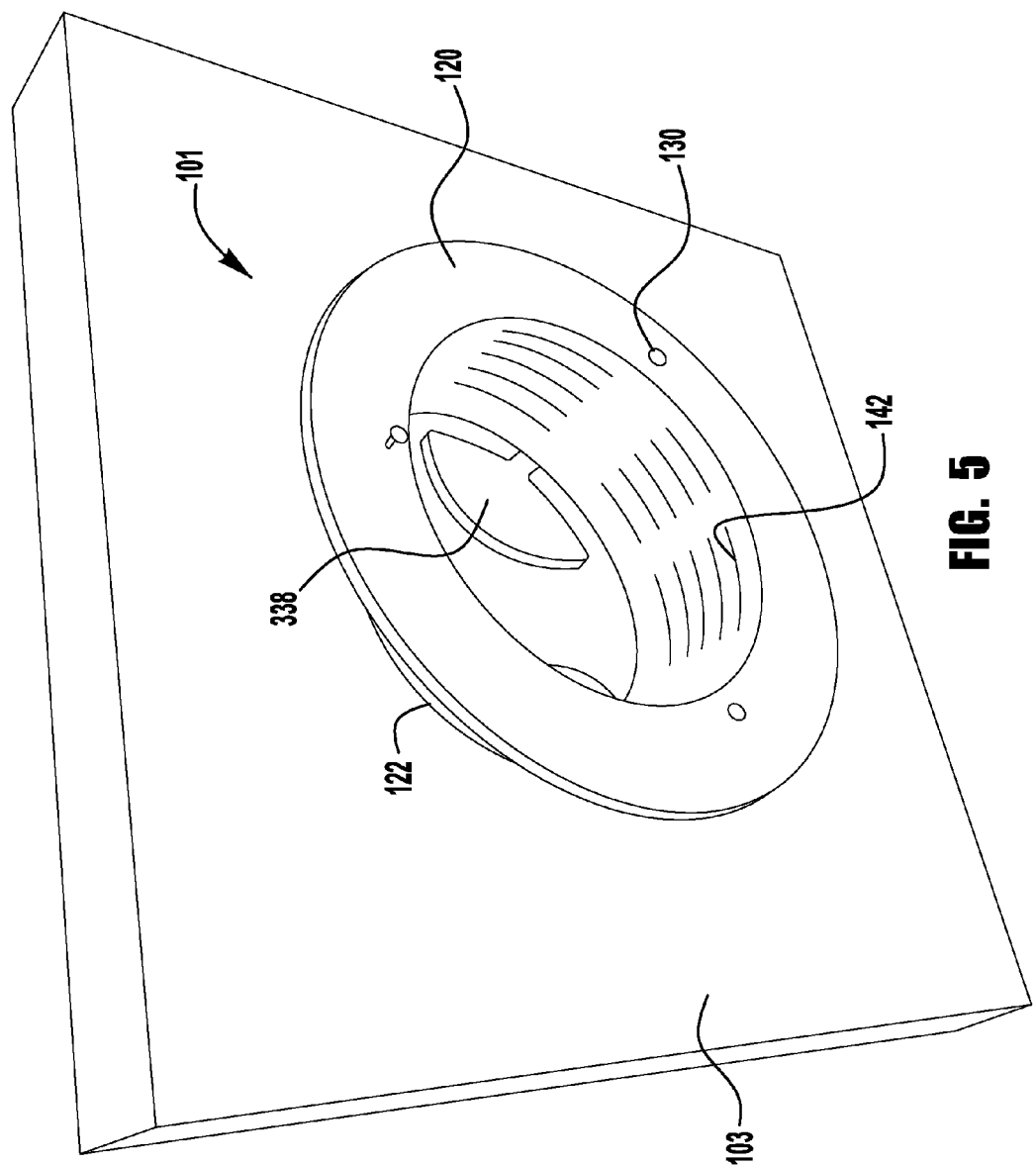
FIG. 5 is a front perspective view of the exemplary duct connector of FIG. 4 assembled to duct board.
Figure 6:
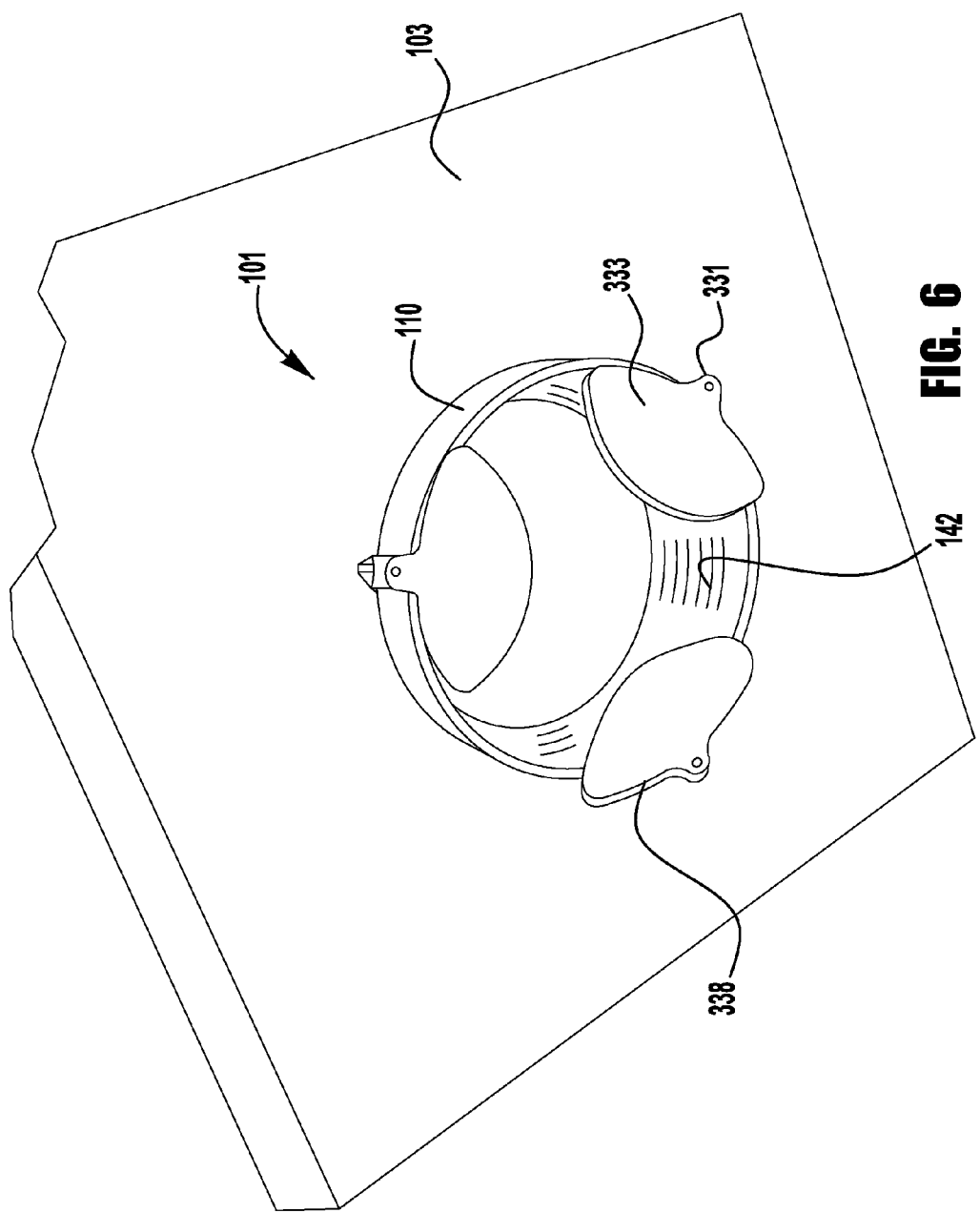
FIG. 6 is a rear perspective view of the exemplary duct connector of FIG. 4 assembled to duct board with mounting tabs in an un-deployed position.
Figure 7:
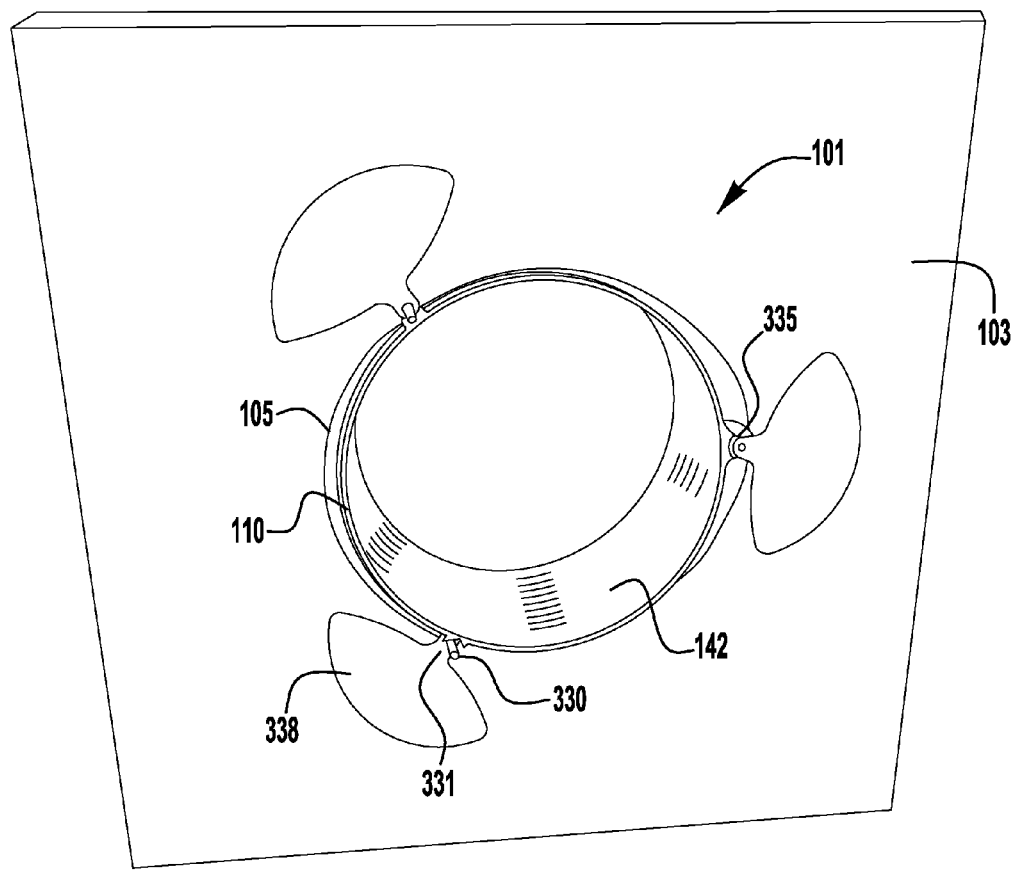
FIG. 7 is a rear perspective view of the exemplary duct connector of FIG. 4 assembled to a piece of duct board with mounting tabs in a deployed position.

FIG. 5 shows the first duct connector 101 inserted into the opening 105 in the duct board 103 until the flange sealing member 122 abuts the duct board 103. At this point the tab members 338 are still in their undeployed position. When the duct connector 101 is fully inserted in the duct board 103 the securing members 130 can be rotated to deploy the tab members 338. In FIG. 6 one of the tab members 338 can be seen in a partially deployed state. The paddle 333 of the partially deployed tab member 338 is shown protruding beyond the central tube 110. Though Further rotation of the securing members 130 moves the paddle portion 333 of each tab member 338 to its fully deployed position, as shown in FIG. 7. During the transition from the undeployed to deployed state, the tab members 338 first rotate until the base 331 of the tab member 338 aligns with the channel 335 holding the shaft 330. Once the base portion 331 aligns with the channel 335, the tab member 338 is pulled toward the duct board 103 by further rotation of the securing member 130 because of the threaded connection between the shaft 330 and the base portion 331 of the tab member 338. When the paddle 333 of the tab member 338 has engaged the duct board 103, further rotation of the securing members 130 increases the securing force exerted by the tab members, thereby increasing the securing and sealing pressures, creating an air tight seal between the duct board and the first duct connector.

FIGS. 8-10A illustrate the steps to assemble a segment of flexible duct 104 to an exemplary second duct connector 102. A typical flexible duct is made of three layers of material: a reinforced core, an insulation layer, and an outer sheath. To create an air tight seal and well insulated connection, the layers are separately assembled to the connector, starting with the innermost layer.

Figure 8:
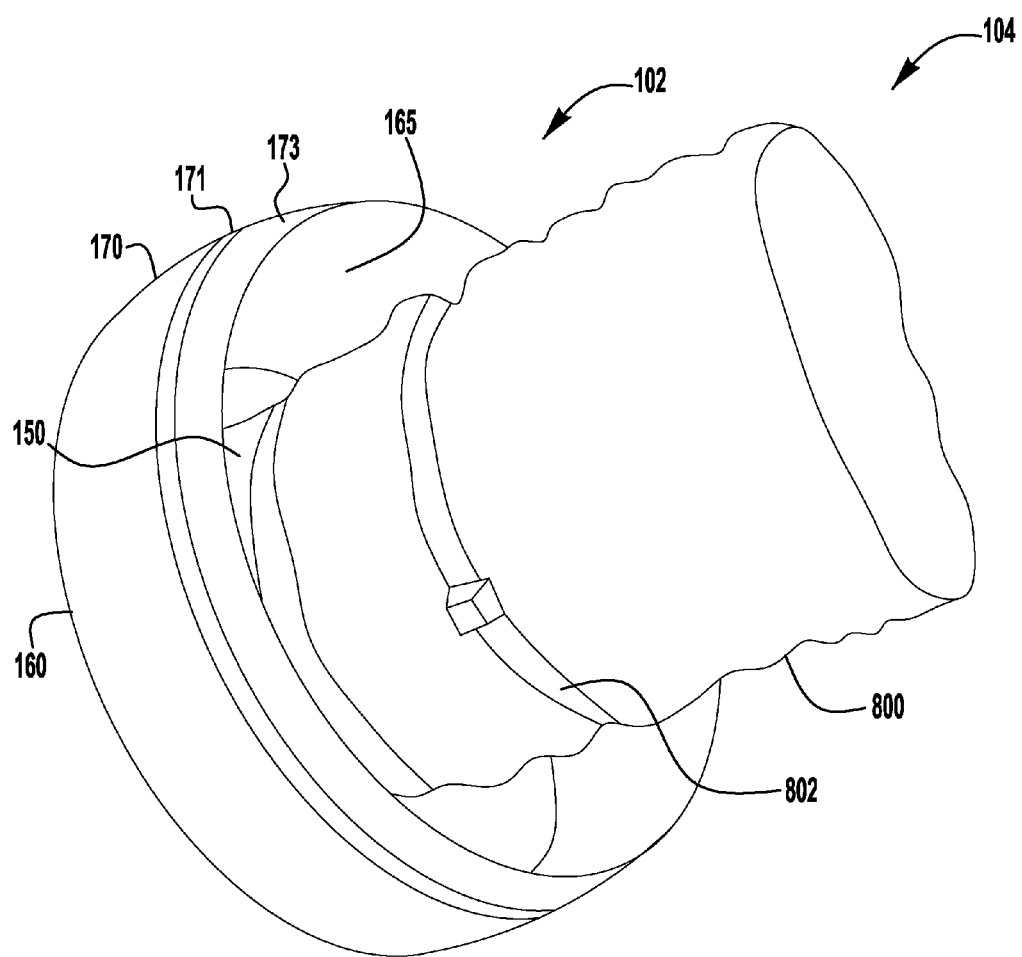
FIG. 8 is a perspective view of an exemplary duct connector assembled to a core tube of a flexible duct.
Figure 8A:
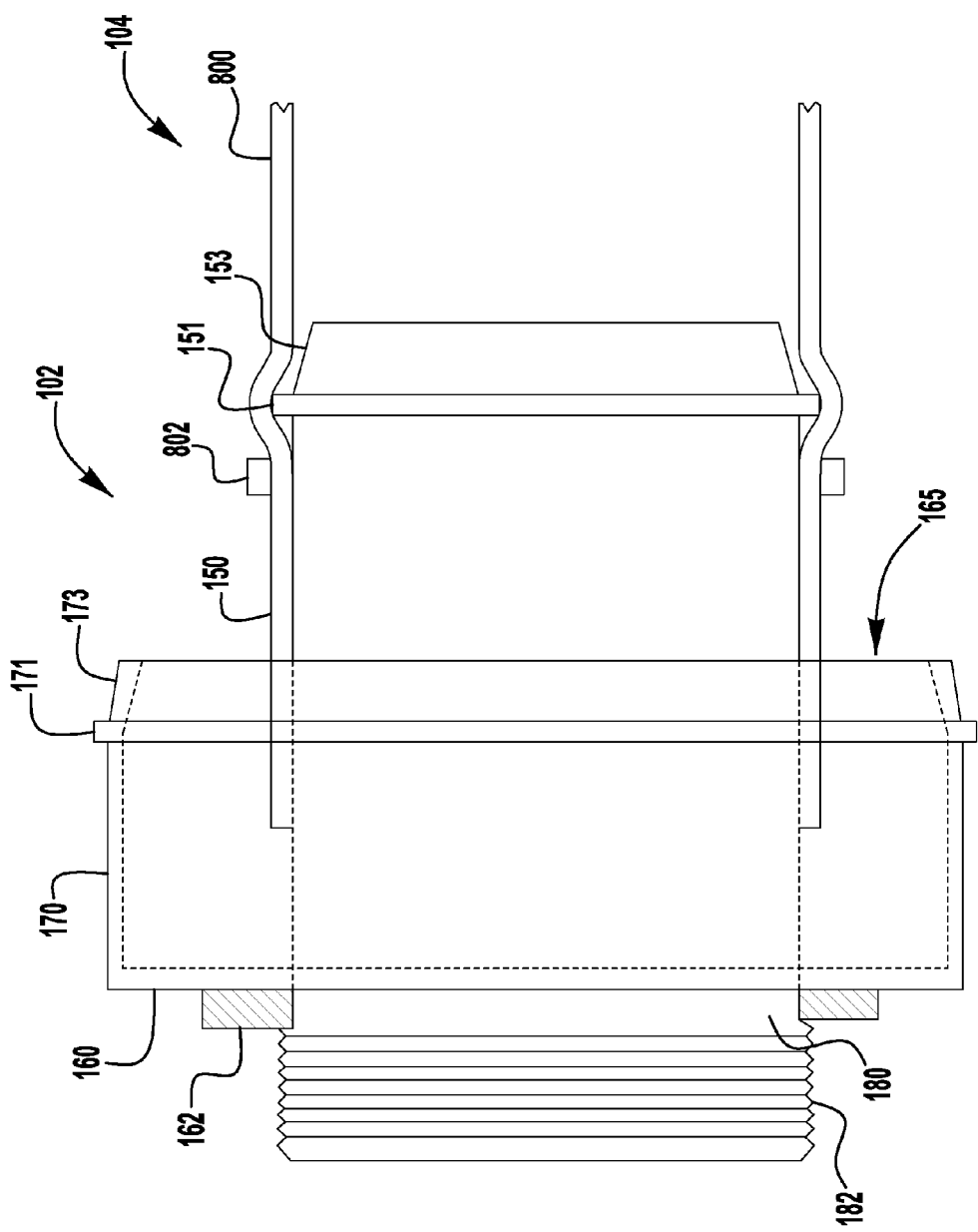
FIG. 8A is a cross-sectional view of the exemplary duct connector and core tube of FIG. 8.
Figure 9:
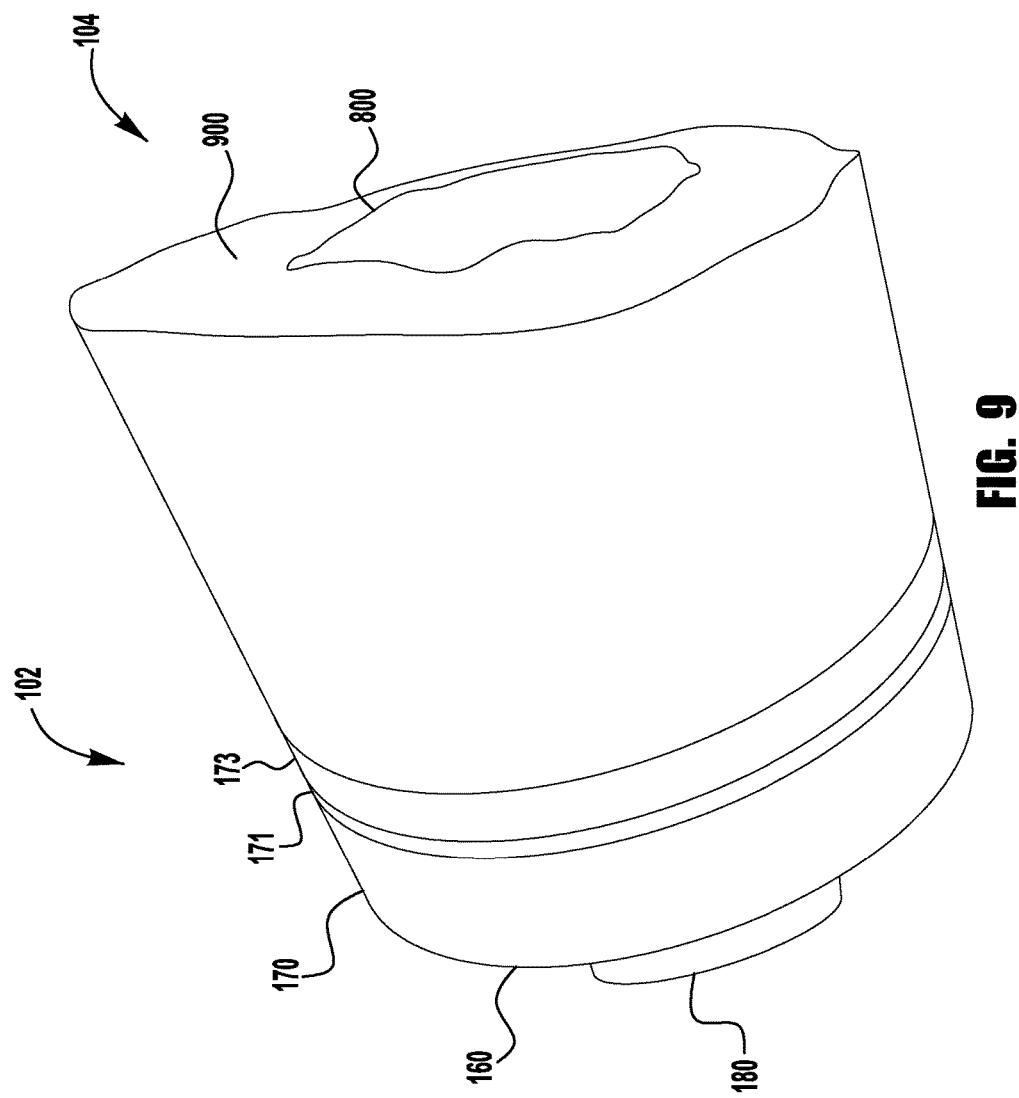
FIG. 9 is a perspective view of the exemplary duct connector and core tube of FIG. 8 wrapped in an insulation layer.

The reinforced core of the flexible duct is the first layer of the duct to be assembled to the second duct connector. FIGS. 8 and 8A illustrate a wire reinforced core 800 of a segment of flexible duct assembled to a central tube 150 of the second duct connector 102. A tapered portion 153 of the end of the central tube 150 of the connector 102 allows the reinforced core 800 of the flexible duct 104 to slide over the central tube 150. The reinforced core 800 is secured to the central tube 150 by a tie fastener 802 positioned on the connector side of an annular ridge 151 on the exterior 156 of the central tube 150. After the reinforced core 800 is secured to the second duct connector 102, the insulation layer can be assembled to the connector 102 as shown in FIGS. 9 and 9A. An insulation layer 900 is inserted into the radial gap 165 between the collar 170 and the central tube 150. The insulation layer 900 is partially compressed when it is inserted into the gap 165, and is held in place by the friction caused by the insulation expanding against the connector 102.

Finally, the outer sheath 106 of the flexible duct 104 is attached to the connector 102, as shown in FIGS. 10 and 10A. The outer sheath 106 overlaps the collar 170 and is secured to the duct connector 102 with a tie fastener 107 positioned past an annular ridge 171 on the collar 170, similar to how the reinforced core 800 is attached to the central tube 150. The outer sheath 106 protects the insulation 900 and reinforced core 800 of the flexible duct 104. In some embodiments, the outer sheath 106 may be formed of a material that allows it to reflect heat from the surrounding environment, thereby providing additional insulation. In some embodiments the outer sheath 106 may be formed of a material that serves as a vapor barrier, preventing moisture from penetrating the flexible duct. Though the fasteners 802, 1002 used to secure the reinforced core 800 and outer sheath 106 to the second duct connector 102 are shown as tie fasteners, any connection means may be used to secure the flexible duct to the second duct connector, such as, for example, a threaded collar, a compression connection, a fastener connection, an adhesive connection, a clamp connection, or the like.

Figure 8B:
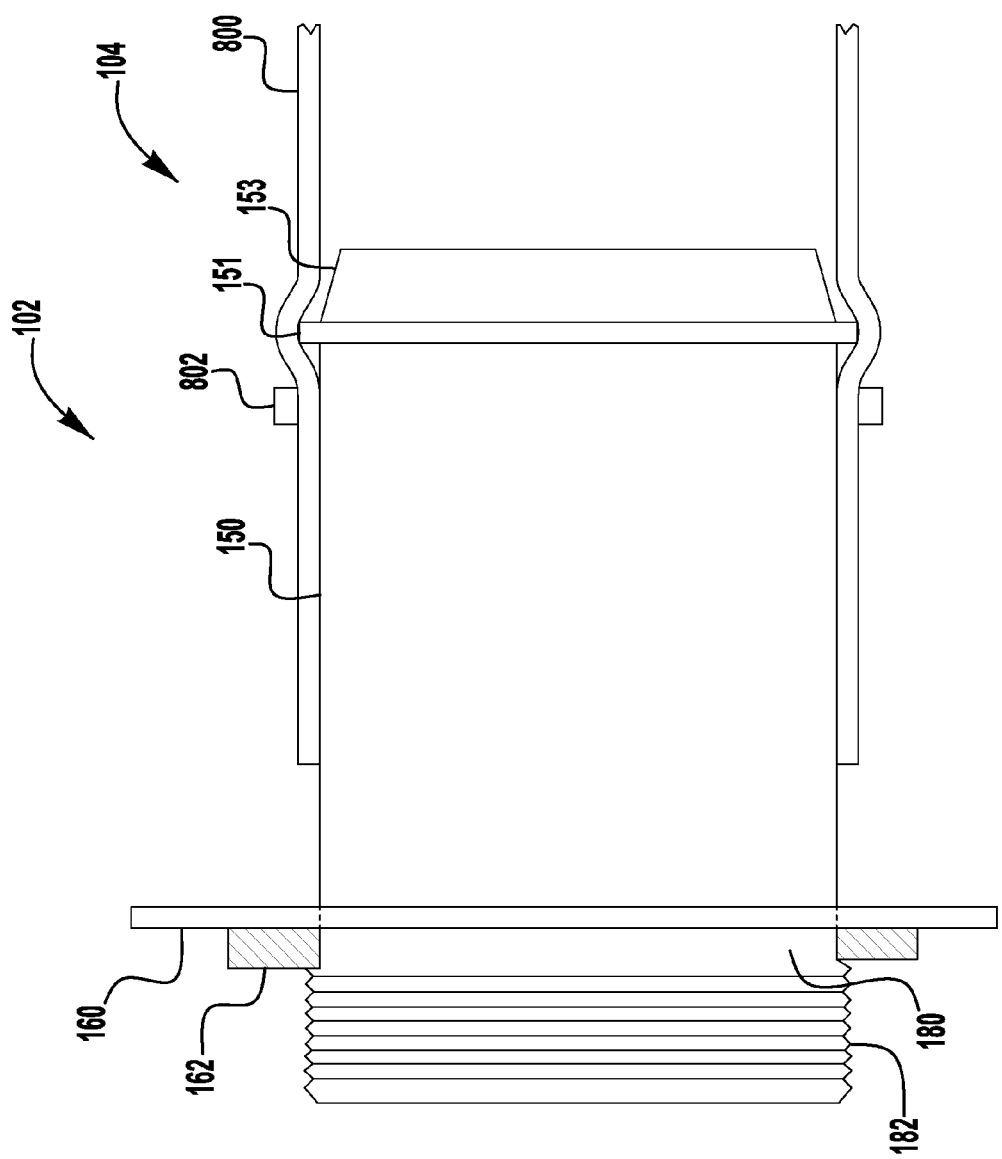
FIG. 8B is a cross-sectional view of the exemplary duct connector and core tube of FIG. 8 without a collar 170.

In the embodiment illustrated in FIG. 8B, the second duct connector 102 does not include a collar 170. In the embodiment of FIG. 8B, the insulation layer 900 and the outer sheath 106 of the flexible duct 104 may be secured to the second duct connector 102 by any means, such as, for example, adhesive, shrink wrap, pipe clamps, tie wraps, or the like.

As shown in FIG. 11, the second duct connector 102 may optionally include a damper 1100 disposed in the interior 155 of the central tube 150 of the second duct connector 102 that is controlled by a damper control lever 1104 on the exterior of the second duct connector 102. A control rod 1102 connects the control lever 1104 to the damper 1100, allowing the damper 1100 to be actuated by movement of the lever 1104. The control rod 1102 passes through openings 1108, 1110 in the collar 170 and central tube 150 respectively, such that the control rod does not interfere with the outer sheath 106, insulation 900, or reinforced core 800 of the flexible duct 104 assembled to the connector 102. The damper may be manually actuated or be actuated with an actuator which may be any kind of actuator, such as, for example, an electric actuator, a pneumatic actuator, a mechanical actuator, or the like. In some embodiments, a weight may be attached to the lever so that the damper acts as a relief valve that opens when the air pressure in the duct reaches a predetermined pressure. The duct connector may also include a sensor for monitoring the conditions of the air inside of the duct connector, such as a temperature sensor, humidity sensor, or any other kind of sensor. Said sensor may be inserted through the collar and central tube of the connector, similar to a control rod for a damper.

FIGS. 12-18 illustrate an exemplary embodiment of a duct connection system for connecting flexible ducts to rigid ducts and plenums in a residential building HVAC system. The illustrated single piece duct connector 1200 is generally annular in shape, though it may be any shape appropriate for connection to flexible ducts. The duct connection system illustrated by FIGS. 12-18 comprises a single piece connector 1200 that can be assembled on-site. The single piece connector 1200 is inserted and anchored in an opening 1201 in a piece of duct board 1202 and is then assembled to a segment of flexible duct (not shown).

Figure 12:
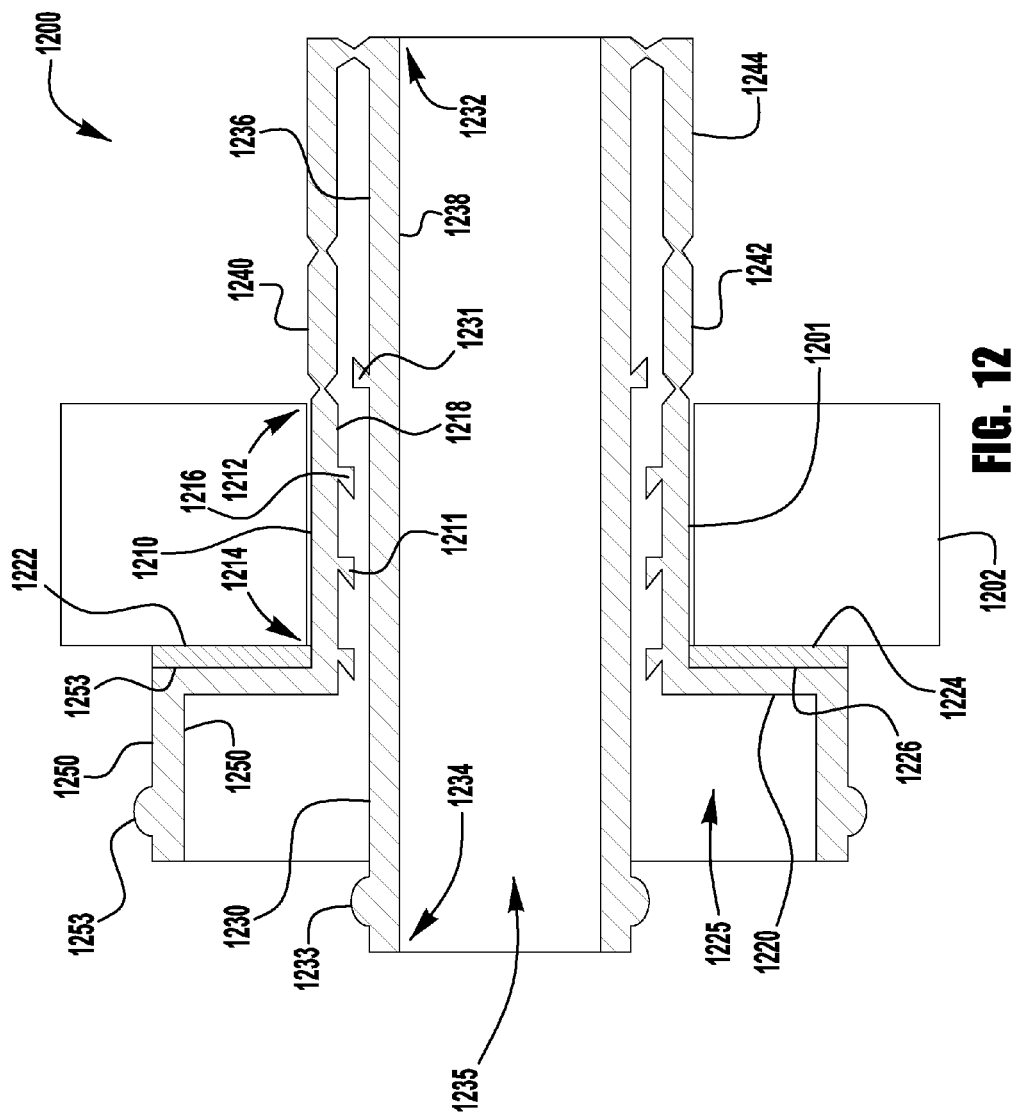
FIG. 12 is a cross-sectional view of a female connector of an exemplary duct connector assembled to duct board in an unexpanded position.

FIG. 12 is a cross-sectional view of an exemplary single-piece flexible duct connector 1200 inserted into an opening 1201 in a piece of duct board 1202. The connector 1200 has an insert 1210, a flange 1220, a central tube 1230 within the insert 1220, and multiple anchor members 1240. The insert 1210 of the duct connector 1200 is insertable into the opening 1201 in the duct board 1202 and has a first end 1212, a second end 1214, an outer surface 1216, and an inner surface 1218. The central tube 1230 is moveable between an initial position and a locked position, and has a first end 1232, a second end 1234, an outer surface 1236, and an inner surface 1238. Air flows through the connector 1200 through the interior 1235 of the central tube 1230. Each anchor member 1240 has a bearing portion 1242 and a brace portion 1244 that are hingeably connected to each other. Each bearing portion 1242 is hingeably connected to the first end 1212 of the insert 1210, and each brace portion 1244 is hingeably connected to the first end 1232 of the central tube 1230.

The flange 1220 is rigidly connected to the second end 1214 of the insert 1210 and includes a front surface 1224 facing the duct board 1202 and a back surface 1226 facing away from the duct board 1202. A collar 1250 extends from the back surface 1226 of the flange 1220 and has an outer surface 1226 and an inner surface 1224. A flange sealing member 1222 disposed between the front face 1224 of the flange 1220 and the duct board 1202 creates an air-tight seal between the duct board 1202 and the duct connector 1200. The flange sealing member 1222 may be attached to the duct board 1202, the connector 1200, or both, by any connecting means, such as, for example, an adhesive connection, a threaded connection, a fastener connection, or the like. The flange sealing member 1222 may also be compressed between the flange and the duct board to hold it in position.

The duct connector 1200 shown in FIG. 12 is in an unexpanded condition. Moving the central tube 1230 into the locked position transitions the duct connector 1200 into an expanded condition, shown in FIG. 13. The central tube 1230 held in the locked position by a locking ridge 1231 on its outer surface 1236 that engages one of the multiple corresponding locking ridges 1211 on the inner surface 1218 of the insert 1210.

Figure 14:
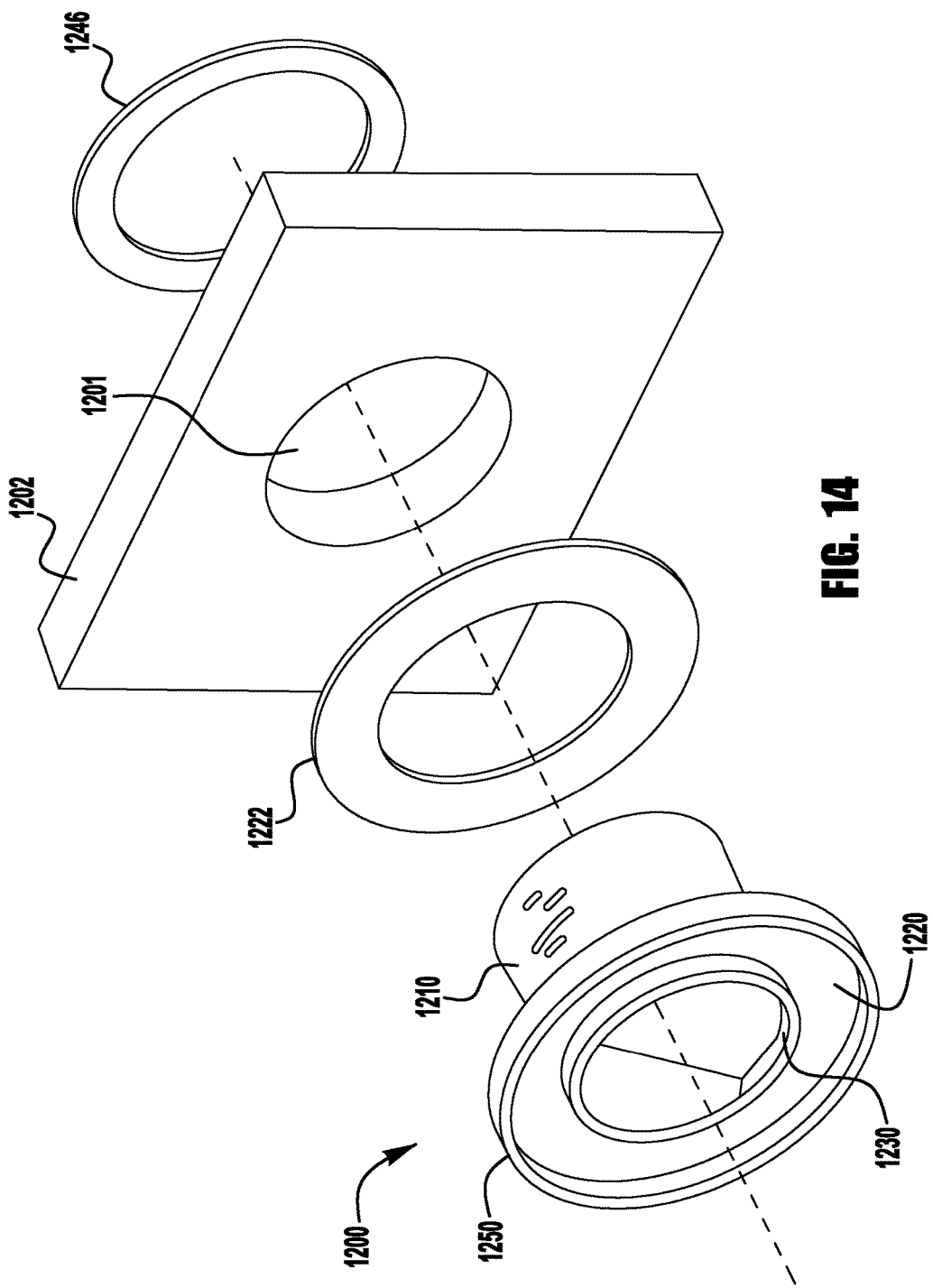
FIG. 14 is a perspective exploded view of an exemplary duct connector and duct board.
Figure 15:
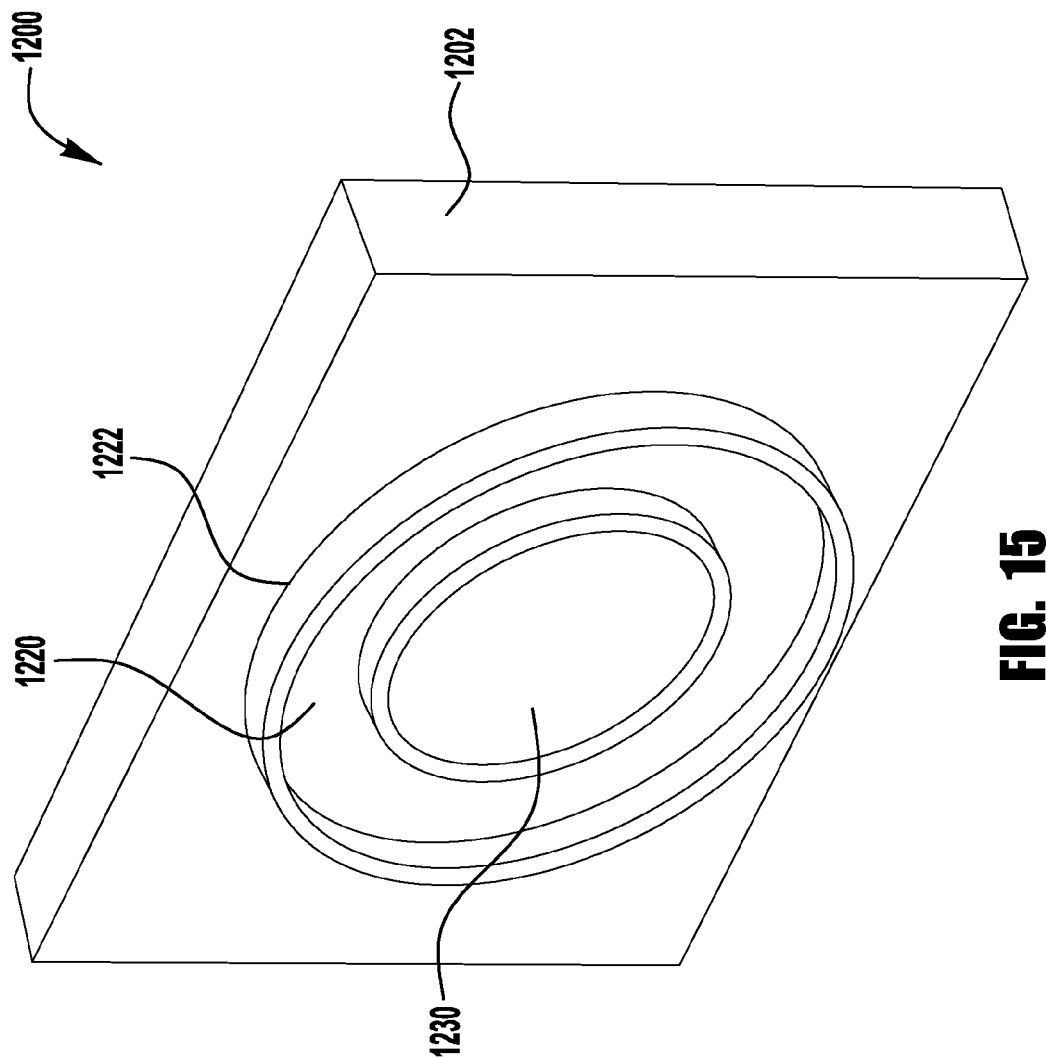
FIG. 15 is a front perspective view of the exemplary duct connector of FIG. 14 assembled to duct board in an unexpanded position.
Figure 16:
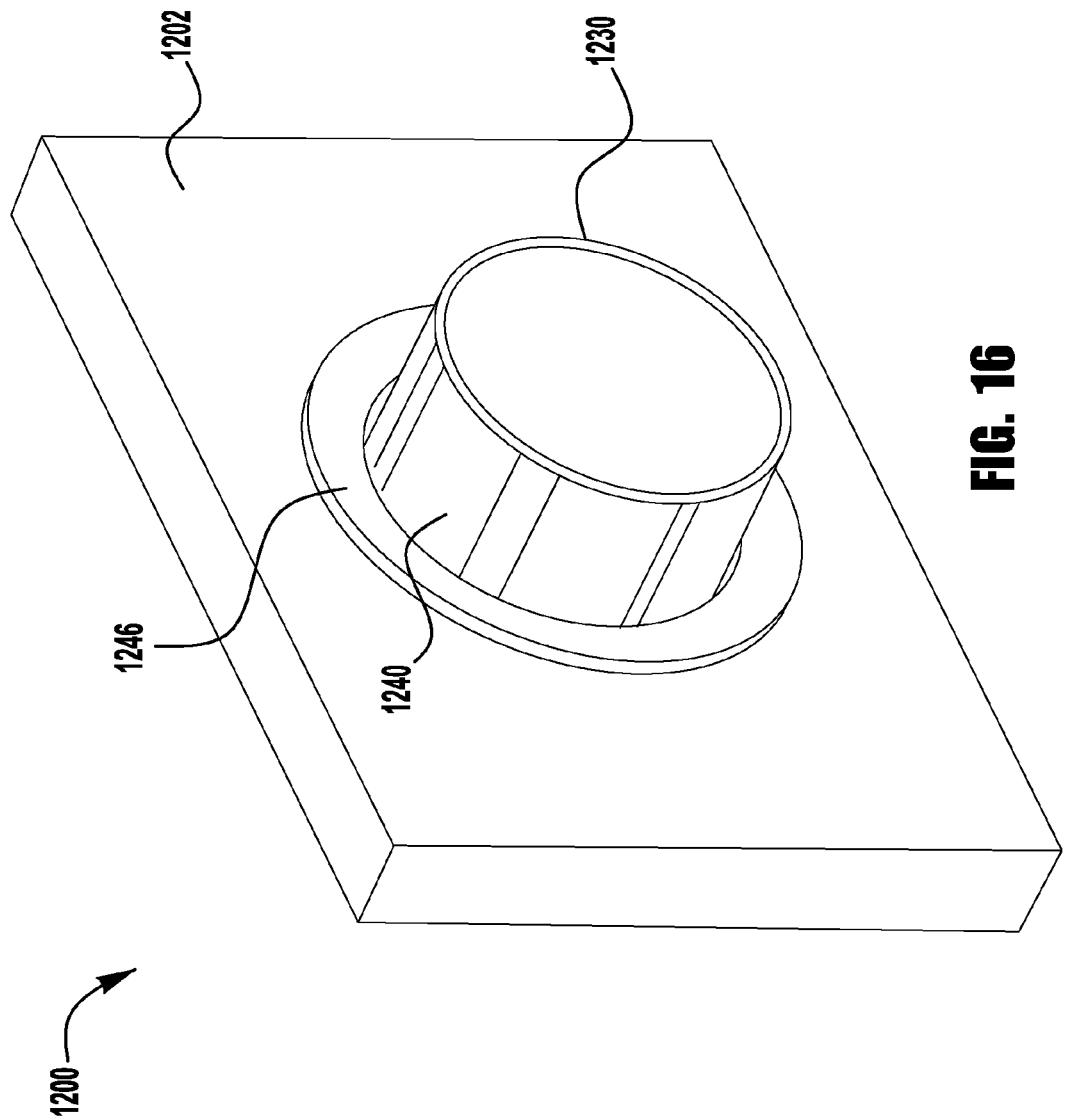
FIG. 16 is a rear perspective view of the exemplary duct connector of FIG. 14 assembled to duct board in an unexpanded position.
Figure 17:
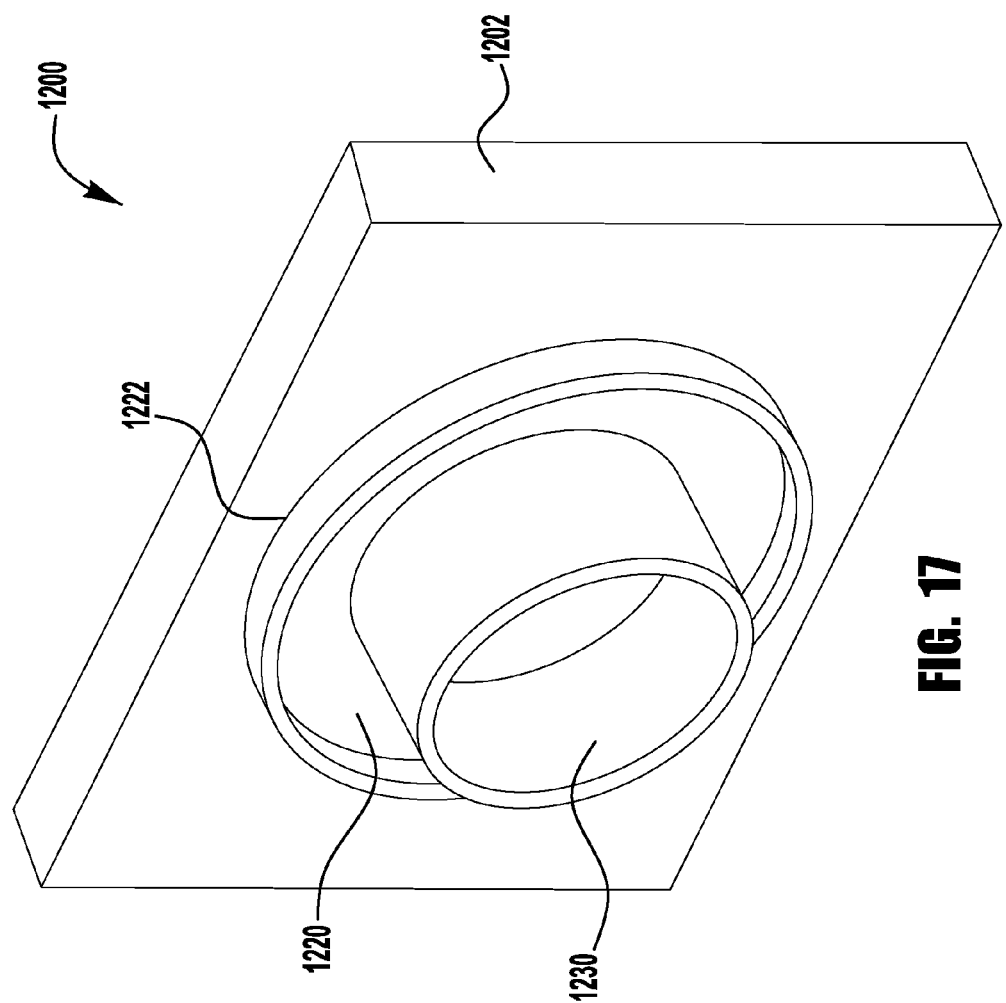
FIG. 17 is a front perspective view of the exemplary duct connector of FIG. 14 assembled to duct board in an expanded position.
Figure 18:
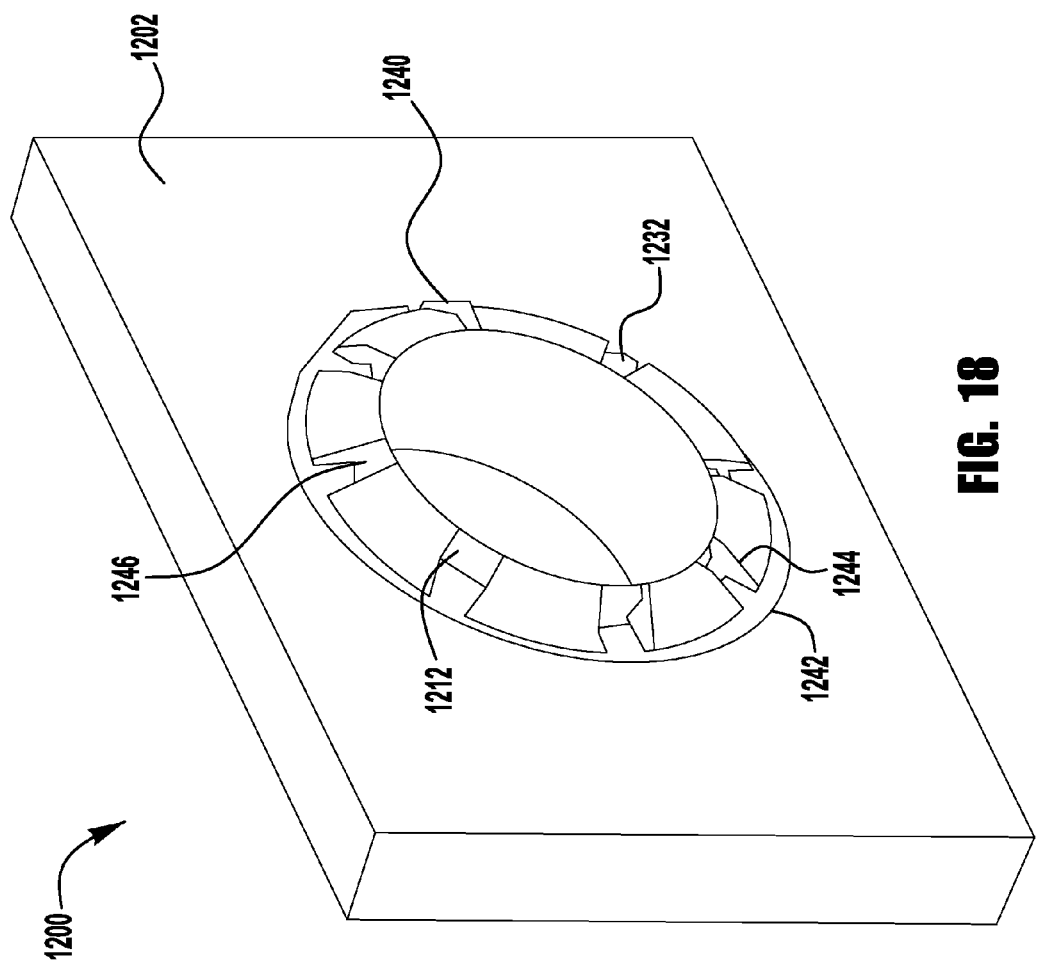
FIG. 18 is a rear perspective view of the exemplary duct connector of FIG. 14 assembled to duct board in an expanded position.

FIGS. 14-18 illustrate the installation of an exemplary single-piece duct connector 1200 into a piece of duct board 1202. FIG. 14 is an exploded view of the duct connector 1200, flange sealing member 1222, duct board 1202, and an optional anchor pad 1246. FIG. 15 shows the unexpanded duct connector 1200 inserted into the duct board 1202 with the central tube 1230 in its initial position. The anchor members 1240 and the first end 1232 of the central tube 1230 can be seen in FIG. 16. In FIG. 17, the central tube 1230 has been pulled back to its locked position, and is now ready for assembly to a flexible duct. FIG. 18 illustrates the expanded condition of the duct connector.

Figure 13:
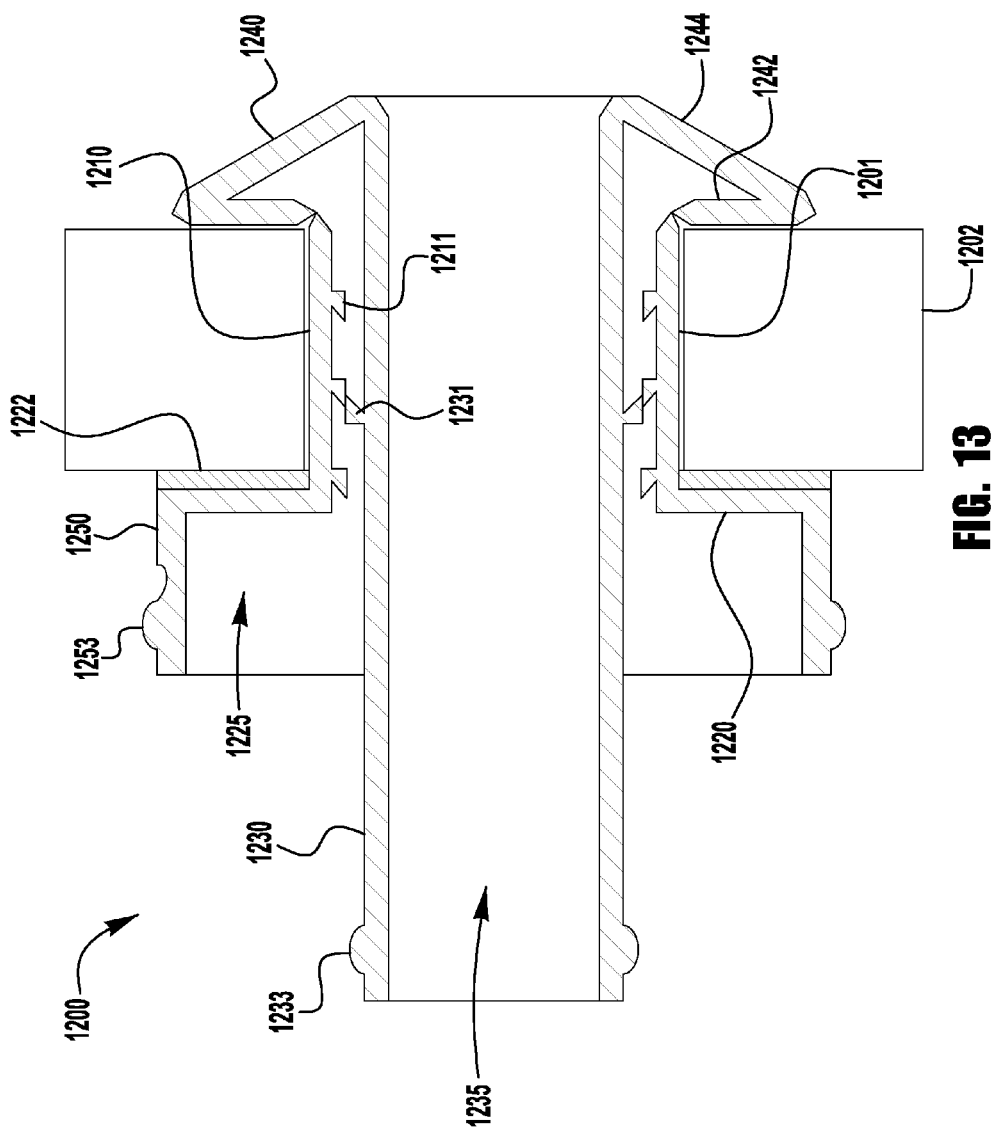
FIG. 13 is a cross-sectional view of a female connector of an exemplary duct connector assembled to duct board in an expanded position.

When the central tube 1230 is in its initial position, shown in FIGS. 12, 14, 15, and 16, the anchor members 1240 are generally unbent, allowing the duct connector 1200 to be inserted into the opening 1201 in the duct board 1202, as shown in FIGS. 15 and 16. After the duct connector 1200 is inserted into the duct board 1202, the insert 1210 and flange 1220 are held against the duct board 1202 as the central tube 1230 is pulled back to secure the connector 1200 in the duct board opening 1201, as shown in FIG. 17. As the axial distance between the first end 1212 of the insert 1210 and the first end 1232 of the central tube 1230 is reduced, the anchor members 1240 bend outwards from the central tube 1230. The anchor members 1230 continue to bend until the bearing portions 1242 of the anchor members 1240 are pressed firmly against the duct board 1202 by the brace portions 1244 of each anchor member 1240, as shown in FIGS. 13 and 18. The central tube 1230 is held in its locked position by locking ridges 1211, 1231. As can be seen in FIGS. 12 and 13, the insert 1210 may include multiple locking ridges 1211 to provide a range of positions of the central tube 1230. Different locked positions of the central tube provide control over the amount of force exerted on the duct board and adjustment based on the thickness of the duct board.

When the single-piece duct connector 1200 is in the expanded condition, as shown in FIG. 17, a segment of flexible duct (not shown) can be assembled to the connector as described above and illustrated by FIGS. 8-10. Once the flexible duct is assembled to the connector, a fastener (not shown) and an annular ridge 1253 located on the outer surface 1256 of the collar 1250 prevent the outer sheath (not shown) of a flexible duct from sliding off the collar after installation. A similar annular ridge 1233 and fastener (not shown) on the outer surface of the central tube secure the reinforced core of a flexible duct to the connector. An insulation layer (not shown) of a flexible duct is received in a radial gap 1225 between the inner surface 1258 of the collar 1250 and the outer surface 1236 of the central tube 1230.

Figure 19:
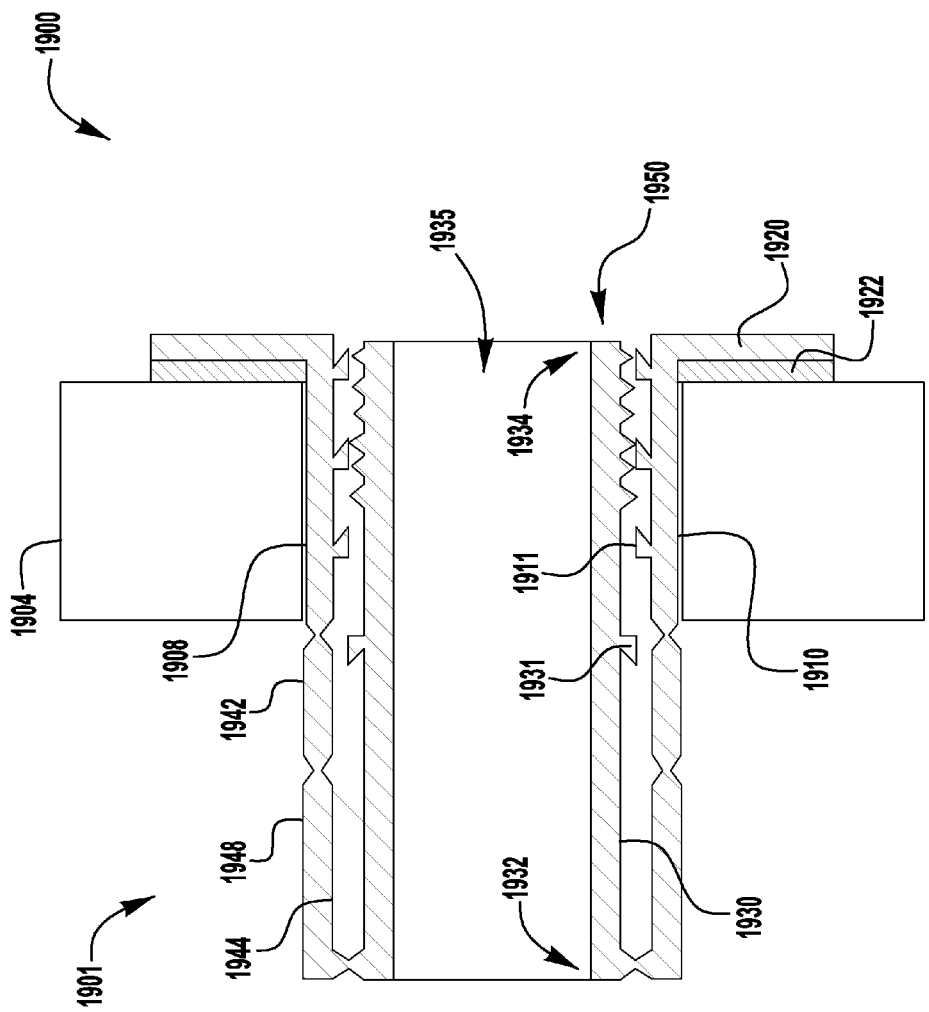
FIG. 19 is a cross-sectional view of the exemplary duct connector of FIG. 14 assembled to duct board in an unexpanded position.
Figure 20:
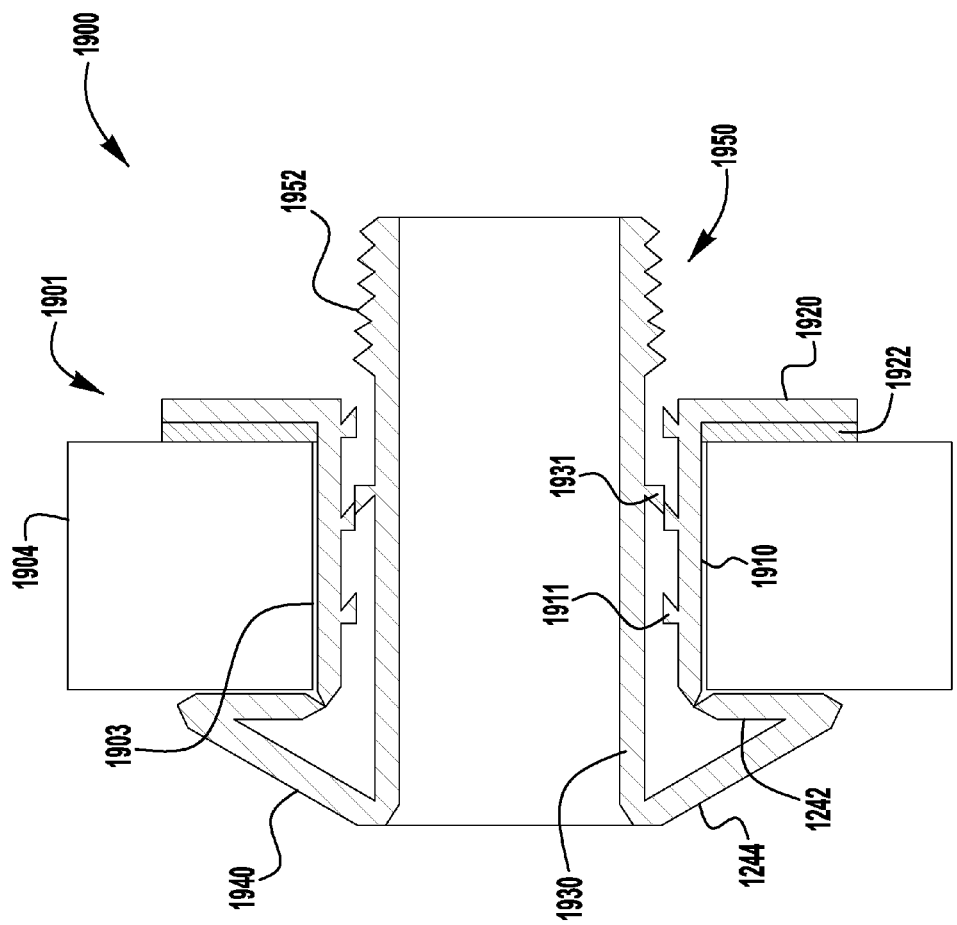
FIG. 20 is a cross-sectional view of the exemplary duct connector of FIG. 14 assembled to duct board in an expanded position.
Figure 21:
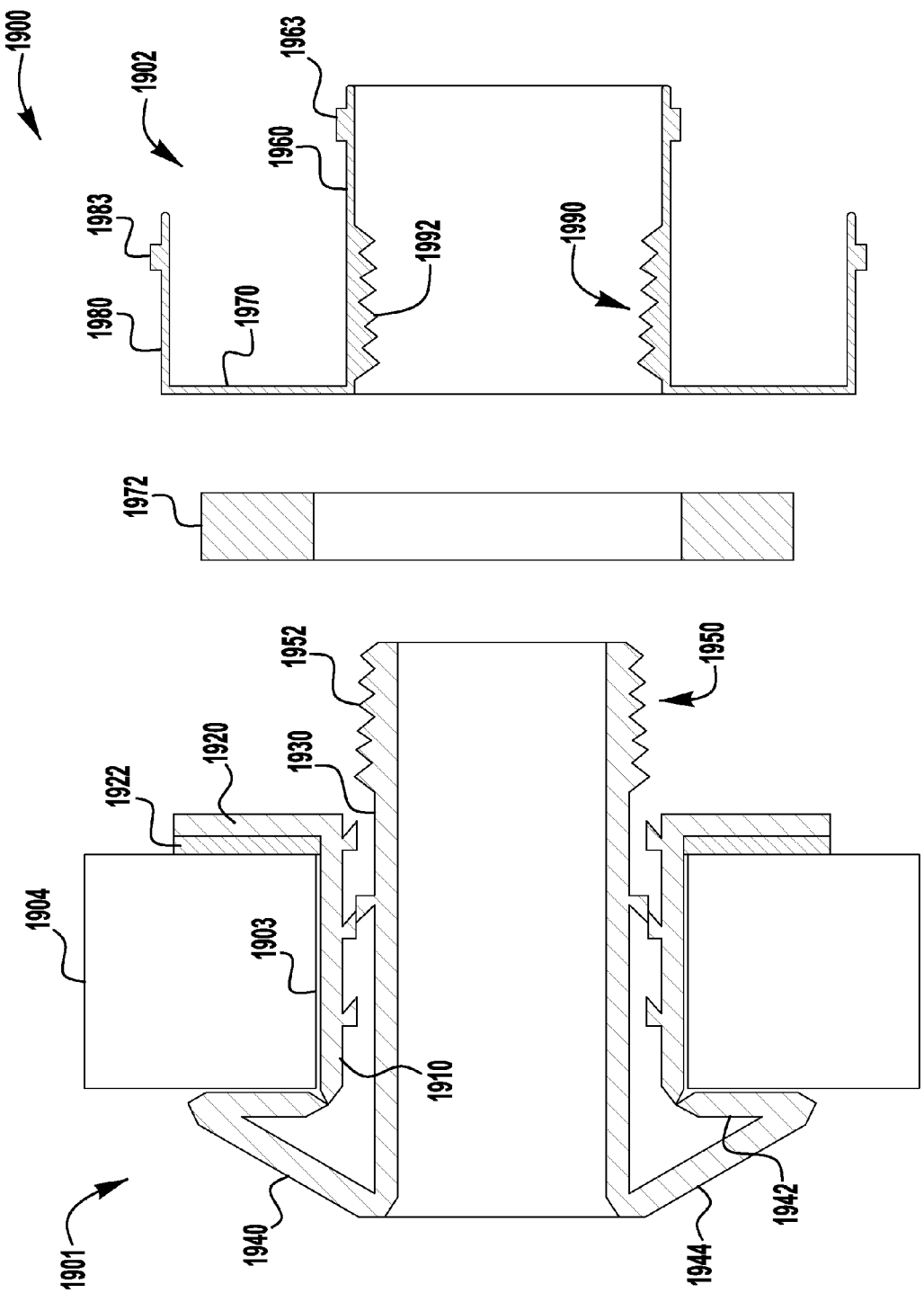
FIG. 21 is a cross-sectional exploded view of an exemplary duct connector.

FIGS. 19-21 illustrate an exemplary embodiment of a duct connection system 1900 for connecting flexible ducts to rigid ducts and plenums in a residential building HVAC system. The duct connection system 1900 is similar to the two piece duct connection system 100 illustrated in FIGS. 1-11. The duct connection system 1900 includes of a first connector 1901 connected to duct board 1904, and a second connector 1902 connected to a flexible duct (not shown). Like connection system 100, either connector 1901, 1902 can be a male or female connector.

Referring now to FIG. 19, the first connector 1901 is inserted into an opening 1903 in the duct board 1904. The first connector 1901 attaches to the duct board 1904 using anchor members 1940 like the duct connector 1200 illustrated in FIGS. 12-18. FIG. 19 illustrates the central tube 1930 of the connector 1901 in an initial position, and FIG. 20 shows the central tube 1930 in a locked position, held in place by locking ridges 1911, 1931 on the insert 1910 and central tube 1930, respectively.

Referring now to FIG. 21, the second connector 1902 is shown. Each connector 1901, 1902 has a mating portion 1950, 1990 that allows the connectors to be joined. Like the connection system 100, mating portions 1950, 1990 include locking ridges 1952, 1992 that securing the mating portions together. The second connector 1902 is configured to be attached to a flexible duct (not shown) with annular ridges 1983, 1963 for securing an outer sheath (not shown) and reinforced core (not shown). This embodiment of the duct connection system combines the features of the previous two embodiments. The duct connection system 1900 gives the installer the option of assembling the flexible duct to one connector, leaving only the duct board connector to be installed while in the attic or another tight space within a residential structure.

FIGS. 22-34 illustrate an exemplary embodiment of a duct connection system 2200 for connecting flexible ducts to rigid duct members, such as duct boards 2203 and duct outlet boots 2230, of a residential building HVAC system. The duct connection system 2200 includes a duct board connector 2210 inserted in an opening 2201 in a duct board 2203, a first duct connector 2220 connected to a first end of a flexible duct 2202, a second duct connector 2221 connected to a second end of the flexible duct 2202, and a duct boot 2231 connector of a duct boot 2230 connected to a wall or other surface 2204 of a room.

Figure 22:
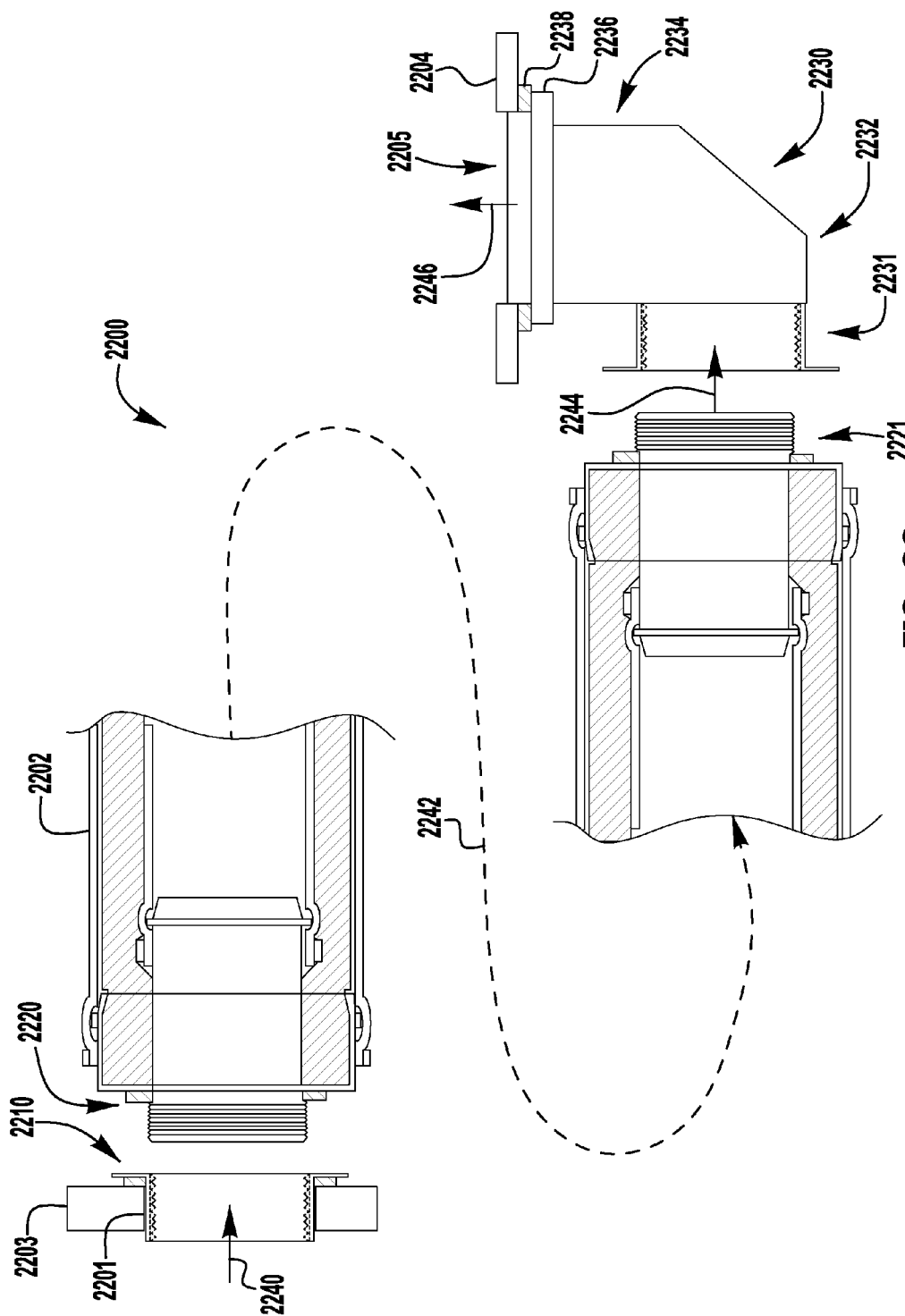
FIG. 22 is a cross-sectional view of an exemplary duct connection system.

Referring now to FIG. 22, a duct connection system 2200 is shown connecting a flexible duct 2202 between a duct board 2203 and a wall of a room 2204. The connectors 2210, 2220, 2221, and 2231 of the duct connection system shown in FIG. 22 are the same as or similar to first and second connectors 101, 102 of the two piece duct connection system 100 illustrated in FIGS. 1-11. The duct board connector 2210 and first duct connector 2220 form an air-tight connection between the duct board 2203 and the flexible duct 2202. The second duct connector 2221 and the duct boot connector 2231 form an air-tight connection between the flexible duct 2202 and the duct boot 2230. The duct board connector 2210 is inserted through an opening 2201 in the duct board 2203 like the first connector 101 shown in FIG. 1, and the first and second duct connectors 2220, 2221 attach to the flexible duct 2202 like the second duct connector 102 shown in FIG. 1. Air flows into the duct connection system 2200 through an inlet flow path 2240, a duct inlet flow path 2242, a duct outlet flow path 2244, and an outlet flow path 2246.

The duct connector 2231 is integrated with an inlet portion 2232 of the duct boot 2230 and connects the duct boot 2230 to the flexible duct 2202. An outlet portion 2234 of the duct boot 2230 is configured to interface with an opening 2205 in the wall 2204. The outlet 2234 may be rectangular, circular, elliptical, or any shape that corresponds with the shape of the opening 2205. The duct boot outlet 2234 includes a flange 2236 and a flange sealing member 2238 for creating a seal with the wall 2204.

FIGS. 23-27 illustrate exemplary embodiments of duct adapters that allow standard sheet metal duct boots that do not include a duct connector 2231 to be used in the duct connection system 2200. The outlet portions 2234 of the duct boots shown in FIGS. 23-27 are rectangular, but can take on any shape, such as, for example, a circle, an oval, a square, or the like to match the shape of an opening in a wall.

Figure 23:
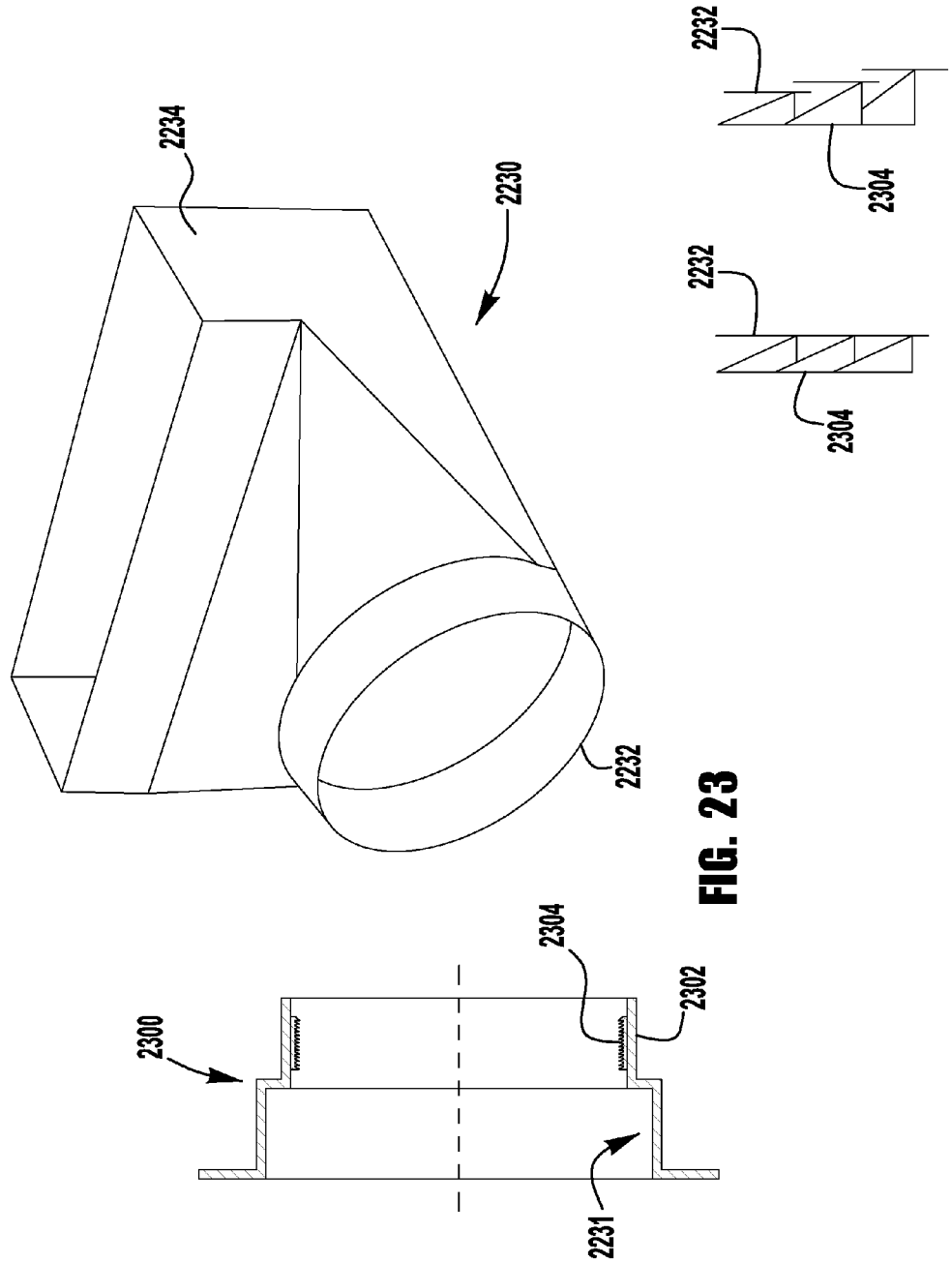
FIG. 23 is a cross-sectional view of an exemplary duct adaptor.

Referring now to FIGS. 23, 23A, and 23B, an exemplary duct adapter 2300 is shown. The duct adapter 2300 includes a duct connector 2231 for connecting with the duct connector 2221, and a connection portion 2302. The duct connector 2231 may have the same or similar features as the duct connector 101 for connecting to a duct connector 102, 2220, and 2221. A gasket 2304 on the interior surface of the connection portion 2302 forms a low air leakage seal with the exterior surface of the inlet portion 2232 of the duct boot 2230 that can be sealed with a sealant, such as, for example, tape, caulk, mastic, or the like. The gasket 2304 is formed of a series of ribs or ridges. The ribs of the gasket 2304 grip onto the exterior surface of the inlet portion 2232 to connect the flexible duct 2202 to the duct boot 2230. The multiple ribs form multiple sealing points with the inlet portion 2232. The gasket 2304 is formed of a pliable and durable material, such as, for example, EPDM rubber or a similar elastomeric material. In some embodiments, as shown in FIG. 23A, the ribs form a serrated profile that increases the force required to remove the adapter 2300 from the duct boot 2230 relative to the force required to insert the inlet portion 2232 into the adapter 2300. In some embodiments, as shown in FIG. 23B, the diameter of the ridges of the gasket 2304 decreases from one ridge to the next to accommodate variations, imperfections, and damage in the diameter of the inlet portion 2232.

Referring now to FIG. 24, an exemplary duct adapter 2400 is shown. The duct adapter 2400 includes a duct connector 2231 for connecting with the duct connector 2221, and a connection portion 2402. The duct connector 2231 may have the same or similar features as the duct connector 101 for connecting to a duct connector 102, 2220, and 2221. A gasket 2404 on the exterior surface of the connection portion 2402 forms a low air leakage seal with the interior surface of the inlet portion 2232 of the duct boot 2230 that can be sealed with a sealant, such as, for example, tape, caulk, mastic, or the like. The gasket 2404 is formed of a series of ribs or ridges. The ribs of the gasket 2404 grip onto the exterior surface of the inlet portion 2232 to connect the flexible duct 2202 to the duct boot 2230. The multiple ribs form multiple sealing points with the inlet portion 2232. The gasket 2404 is formed of a pliable and durable material, such as, for example, EPDM rubber or a similar elastomeric material. In some embodiments, the ribs form a serrated profile that increases the force required to remove the adapter 2400 from the duct boot 2230 relative to the force required to insert the inlet portion 2232 into the adapter 2400, like the gasket 2304 shown in FIG. 23A. In some embodiments, the diameter of the ridges of the gasket 2404 decreases from one ridge to the next to accommodate variations, imperfections, and damage in the diameter of the inlet portion 2232, like the gasket 2304 shown in FIG. 23B.

Figure 25:
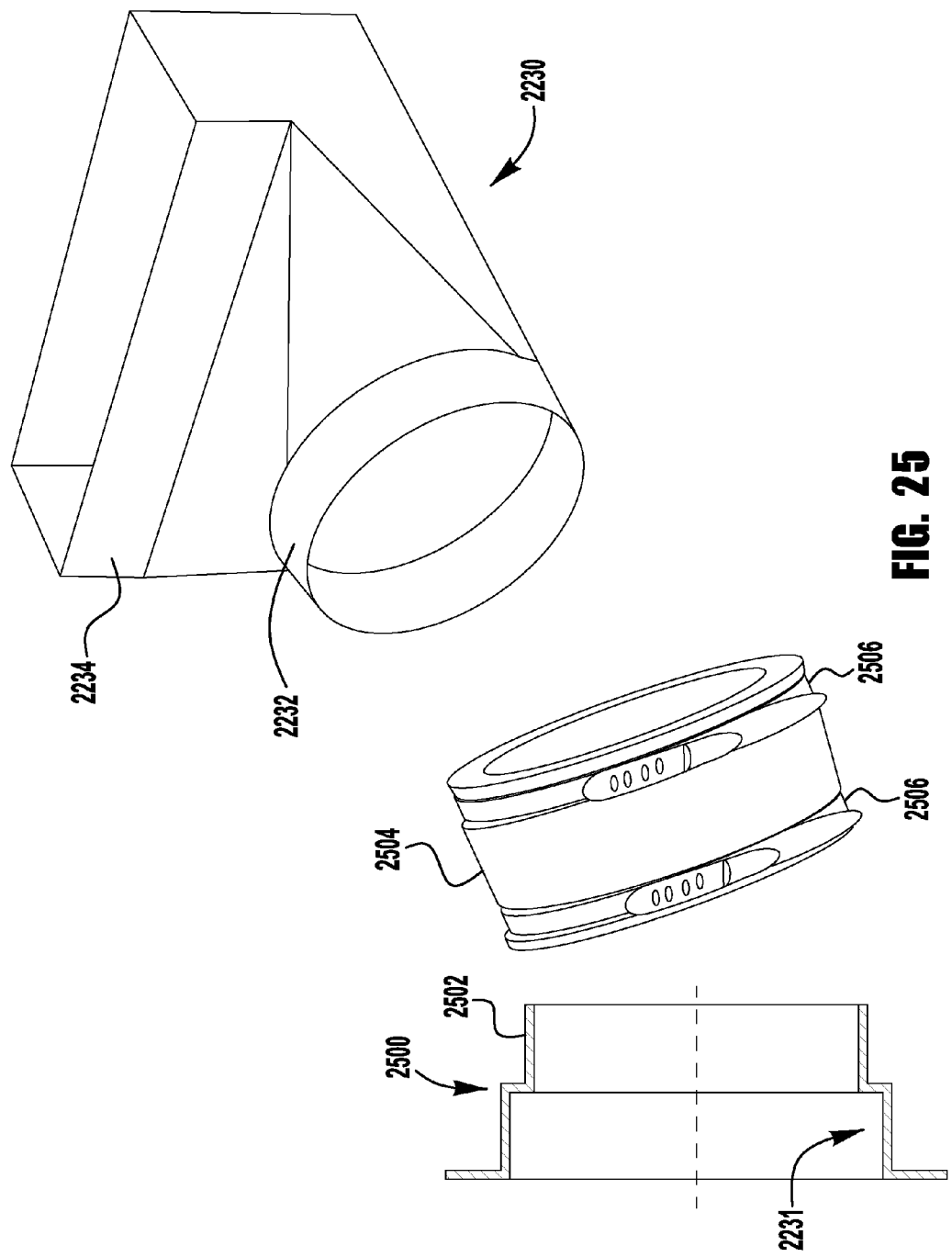
FIG. 25 is a cross-sectional view of an exemplary duct adaptor.

Referring now to FIG. 25, an exemplary duct adapter 2500 is shown. The duct adapter 2500 includes a duct connector 2231 for connecting with the duct connector 2221, and a connection portion 2502. A rubber boot 2504 with pipe clamps 2506 at each end joins the connection portion 2502 of the adapter 2500 and the inlet portion 2232 of the duct boot 2230 in a butt joint arrangement. The pipe clamps 2506 are tightened to form a seal with the adapter 2500 and the inlet portion 2232 of the duct boot 2230.

Referring now to FIG. 26, an exemplary duct adapter 2600 is shown. The duct adapter 2600 includes a duct connector 2231 for connecting with the duct connector 2221, and a connection portion 2602. In one exemplary embodiment, a wide rubber zip tie 2604 secures the connection portion 2602 of the adapter 2600 and the inlet portion 2232 of the duct boot 2230 in a butt joint arrangement. The zip tie 2604 may be from about 0.5 inches wide to about 2 inches wide to cover the joint between the adapter 2600 and the inlet portion 2232 of the duct boot 2230, forming an air-tight seal with each. In another exemplary embodiment, the connection portion 2602 of the adapter 2600 is made from a flexible material and fits over the inlet portion 2232 of the duct boot 2230. In this exemplary embodiment, a conventional zip tie 2604 secures the connection portion 2602 of the adapter 2600 over the inlet portion 2232 of the duct boot 2230.

Figure 27:
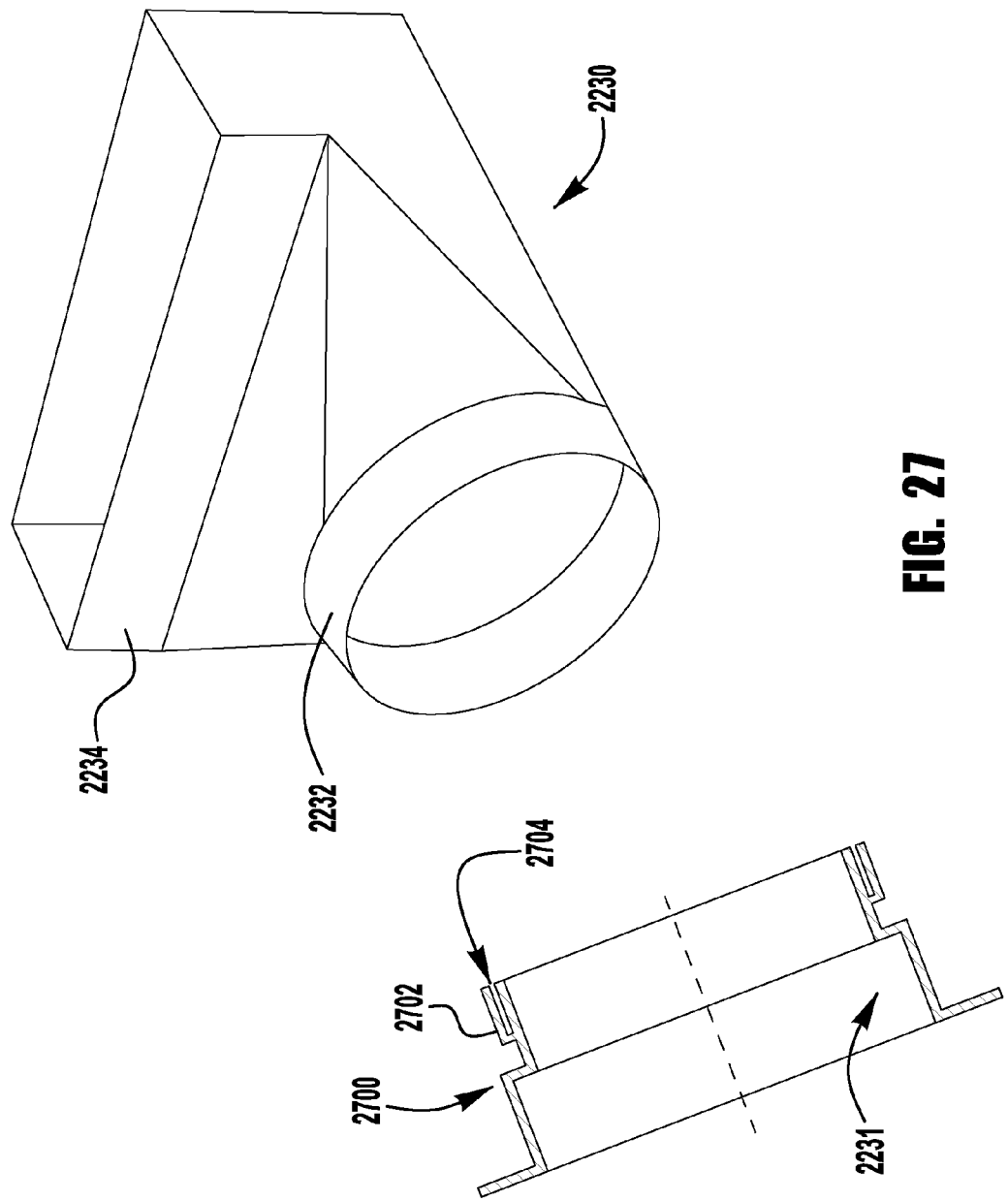
FIG. 27 is a cross-sectional view of an exemplary duct adaptor.

Referring now to FIGS. 27, 27A, 27B, and 27C, an exemplary duct adapter 2700 is shown. The duct adapter 2700 includes a duct connector 2231 for connecting with the duct connector 2221, and a connection portion 2702. The connection portion 2702 includes an annular groove 2704 for receiving the inlet portion 2232 of the duct boot 2230. In some embodiments, as shown in FIG. 27A, a foam portion 2710 is disposed within the groove 2704 for forming a seal with the inlet portion 2232. In some embodiments, as shown in FIG. 27B, a plurality of rubber ribs 2720 are disposed within the groove 2704 for forming a seal with the inlet portion 2232. In some embodiments, the ribs 2720 are serrated like those shown in FIG. 23A. In some embodiments, as shown in FIG. 27C, the groove 2704 is filled with a sealant 2730 for forming a seal with the inlet portion 2232. The sealant 2730 may be any suitable sealant that adheres to the groove 2704 and the inlet portion 2232, such as, for example, caulk, mastic, or the like. Any of the embodiments shown in FIGS. 27A, 27B, and 27C may also include a fastener 2706 to secure the inlet portion 2232 within the groove 2704.

Figure 28:
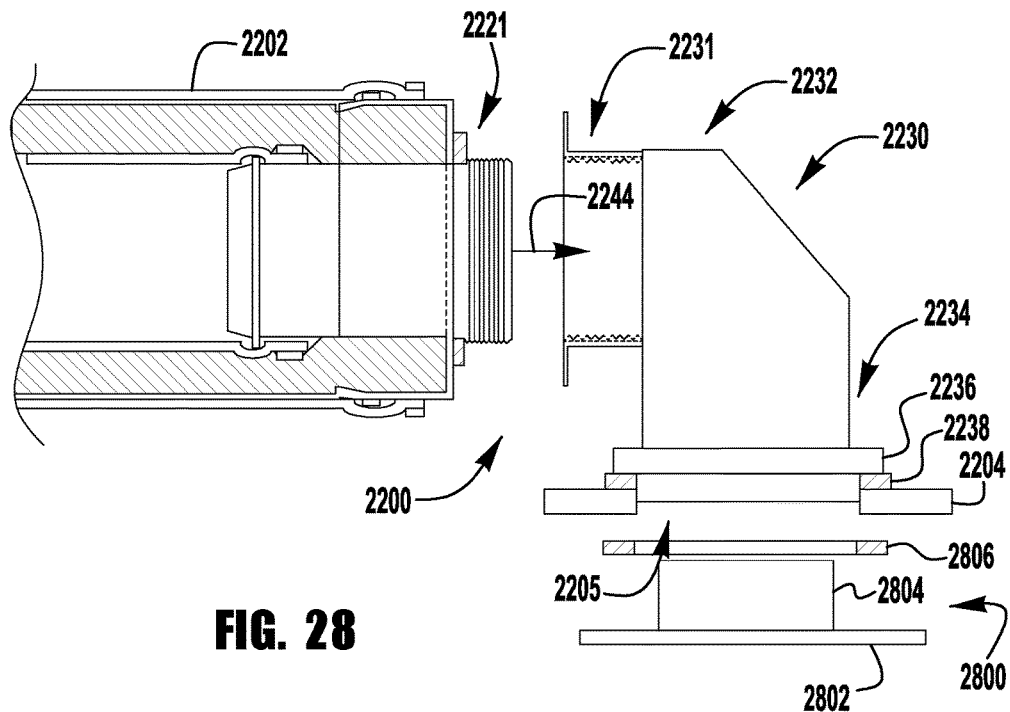
FIG. 28 is a cross-sectional view of an exemplary right-angle duct boot with a securing ring in a disassembled condition.
Figure 28A:
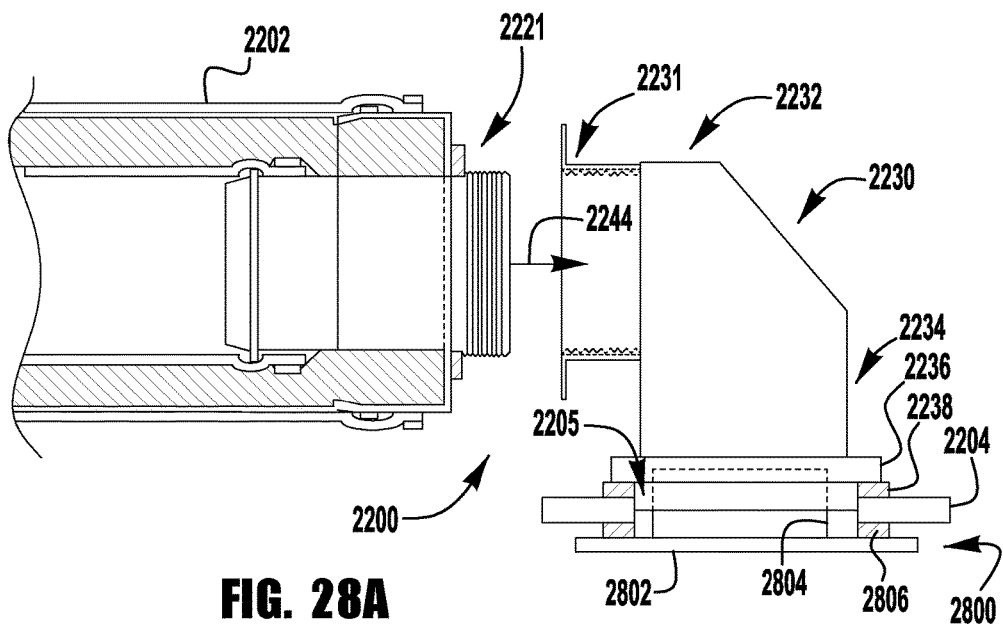
FIG. 28A is a cross-sectional view of the exemplary right-angle duct boot of FIG. 28 with a securing ring in an assembled condition.

Referring now to FIGS. 28, and 28A, an exemplary duct connection system 2200 is shown. The duct connection system 2200 includes a duct boot 2230 that makes a right angle connection between the flexible duct 2202 and the wall 2204. A securing ring 2800 is inserted through the opening 2205 in the wall 2204 to secure the outlet portion 2234 to the wall 2204. The securing ring 2800 has a flange 2802, a mating portion 2804, and a sealing member 2806. The sealing member 2806 forms a seal between the wall 2204 and the flange 2802. The mating portion 2804 is inserted into and attaches to the outlet portion 2234 of the duct boot 2230 so that the duct boot 2230 is pulled against the wall 2204 by the securing ring 2800, forming an air-tight seal with the outlet portion 2234 of the duct boot 2230. The securing ring 2800 is shown in an unassembled condition in FIG. 28, and an assembled condition in FIG. 28A.

Figure 29:
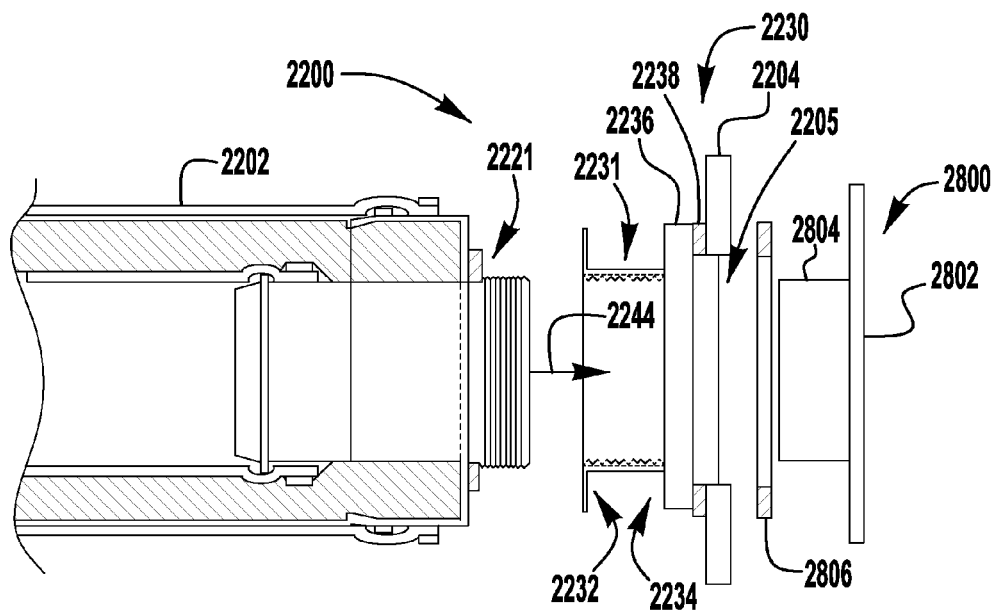
FIG. 29 is a cross-sectional view of an exemplary straight duct boot with a securing ring in a disassembled condition.
Figure 29A:
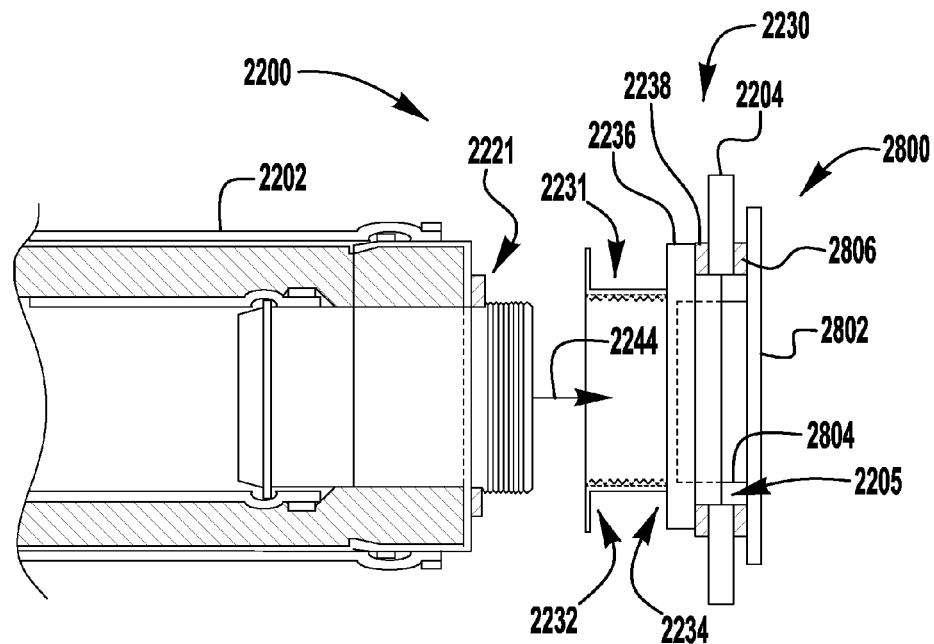
FIG. 29A is a cross-sectional view of the exemplary straight duct boot of FIG. 29 with a securing ring in an assembled condition.
Figure 29B:
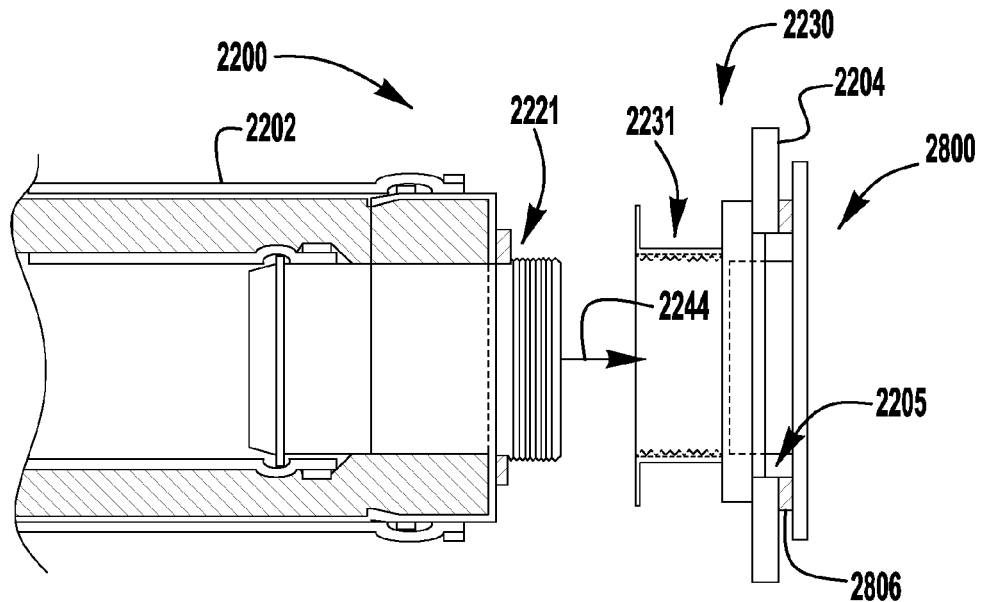
FIG. 29B is a cross-sectional view of the exemplary straight duct boot of FIG. 29 with a securing ring in an assembled condition.

Referring now to FIGS. 29, 29A, 29B, and 29C, an exemplary duct connection system 2200 is shown. The duct connection system 2200 includes a duct boot 2230 that makes a straight connection between the flexible duct 2202 and the wall 2204. A securing ring 2800 is inserted through the opening 2205 in the wall 2204 to secure the outlet portion 2234 to the wall 2204. The securing ring 2800 has a flange 2802, a mating portion 2804, and a sealing member 2806. The sealing member 2806 forms a seal between the wall 2204 and the flange 2802. The mating portion 2804 is inserted into and attaches to the outlet portion 2234 of the duct boot 2230 so that the duct boot 2230 is pulled against the wall 2204 by the securing ring 2800, forming an air-tight seal with the outlet portion 2234 of the duct boot 2230. In some embodiments, as shown in FIG. 29B, the duct boot 2232 does not include a flange sealing member 2238 and the sealing member 2806 forms the only seal with the wall 2204.

Figure 29C:
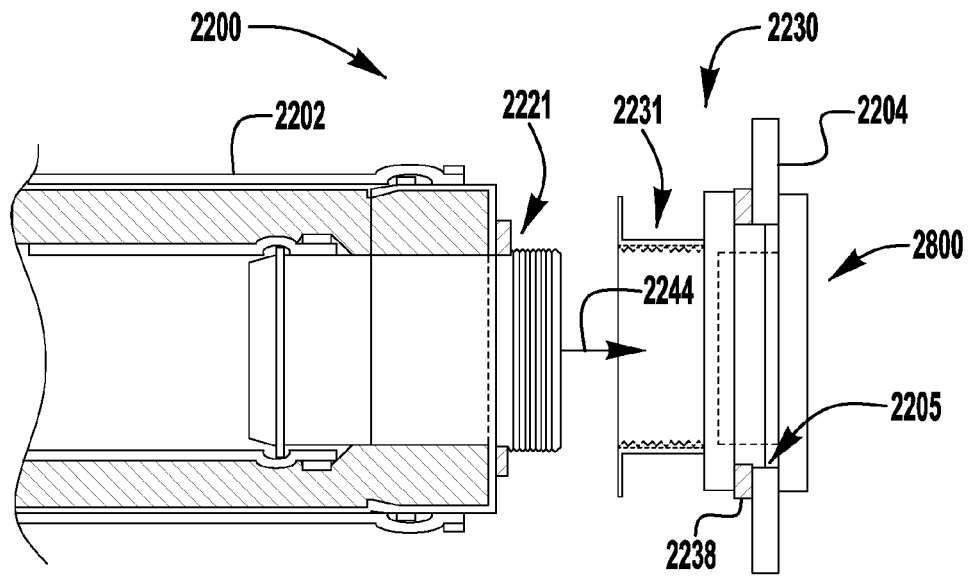
FIG. 29C is a cross-sectional view of the exemplary straight duct boot of FIG. 29 with a securing ring in an assembled condition.

In some embodiments, as shown in FIG. 29C, the securing ring 2800 does not include the sealing member 2806, and the flange sealing member 2238 forms the only seal with the wall 2204. The securing ring 2800 is shown in an unassembled condition in FIG. 29, and an assembled condition in FIGS. 29A, 29B, and 29C.

Figure 30:
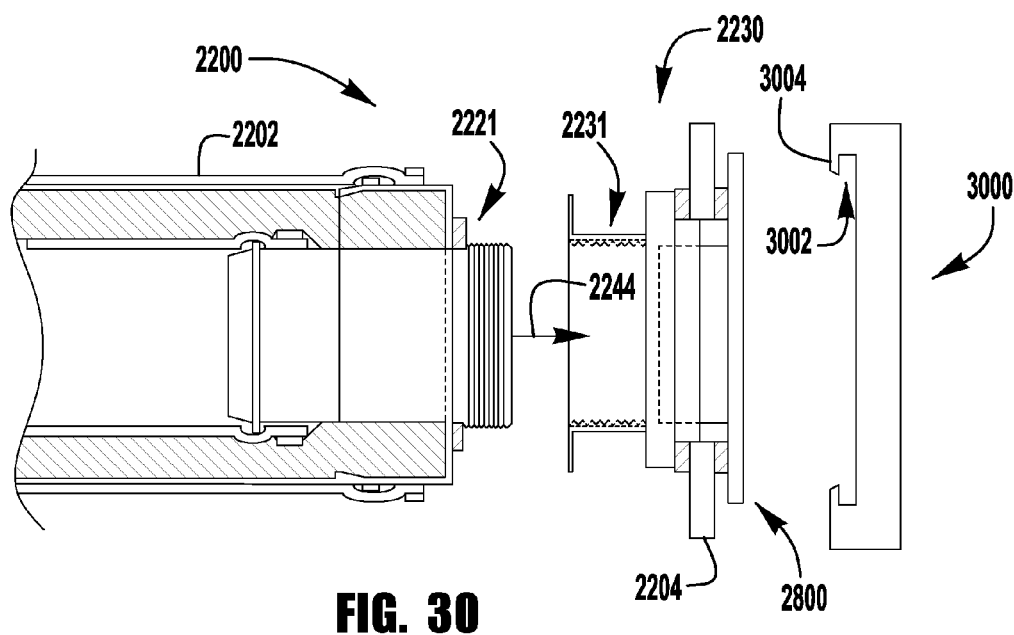
FIG. 30 is a cross-sectional view of the exemplary straight duct boot of FIG. 29 with a cover grate in a disassembled condition.
Figure 30A:
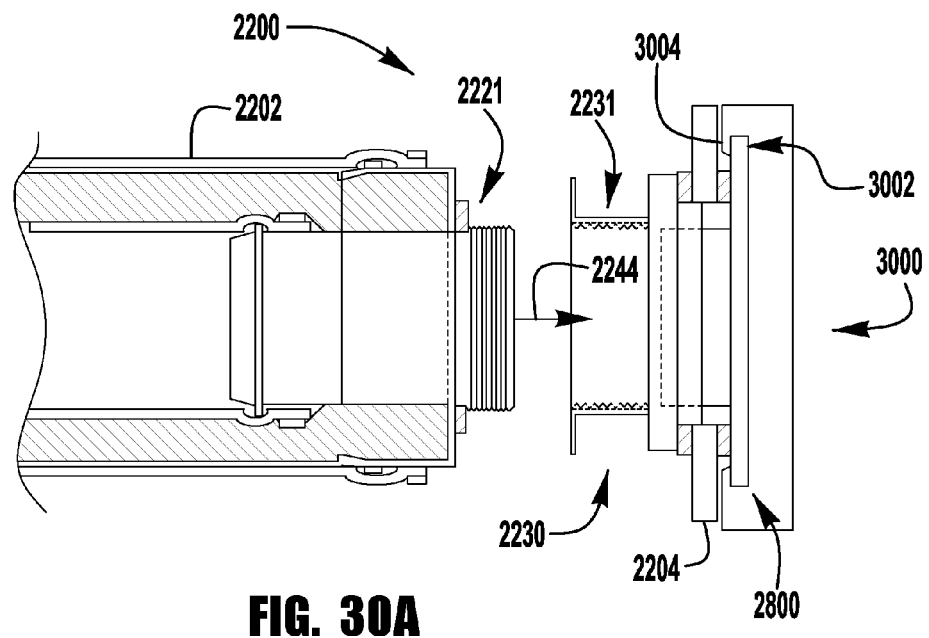
FIG. 30A is a cross-sectional view of the exemplary straight duct boot of FIG. 29 with a cover grate in an assembled condition.

Referring now to FIGS. 30, and 30A, an exemplary duct connection system 2200 is shown. The duct connection system 2200 further includes a cover 3000 that includes a groove 3002 and a plurality of securing members 3004. The cover grate 3000 is shown in an unassembled condition in FIG. 30, and an assembled condition in FIG. 30A. The cover grate 3000 is configured to attach to the securing ring 2800 to provide improved aesthetics, protection from foreign objects entering the duct system 2200, and in some embodiments, directional vanes to direct the flow direction of air leaving the duct system 2200. The groove 3002 is configured to receive the flange 2802 of the securing ring 2800. The securing members 2804 snap around the flange 2802 and hold the cover 3000 to the securing ring 2800. In some embodiments, the securing members 2804 form a continuous ring around the perimeter of the cover grate 3000. While the cover grate 3000 is shown attached to a straight duct boot 2230, the cover grate 3000 may be used on any duct boot 2230 described above.

Figure 31:
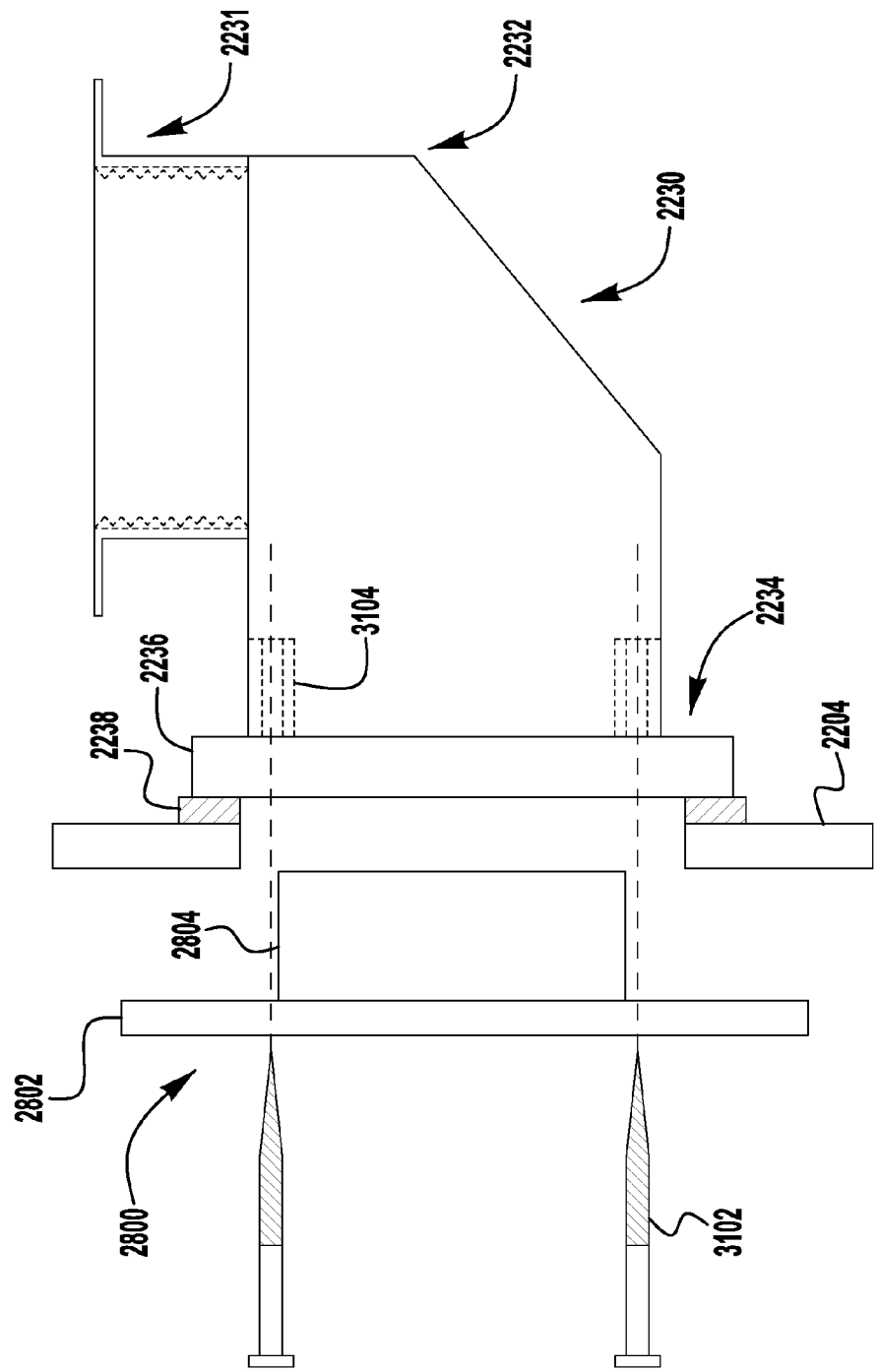
FIG. 31 is a cross-sectional view of an exemplary duct boot with a securing ring in a disassembled condition.

Referring now to FIG. 31, an exemplary duct boot 2230 and securing ring 2800 are shown. The securing ring 2800 is inserted through the opening 2205 in the wall 2204 to secure the outlet portion 2234 to the wall 2204. The securing ring 2800 has a flange 2802 and a mating portion 2804. Fasteners 3102 are inserted through the securing ring 2800 and into threaded portions 3104 disposed inside the outlet portion 2234 of the duct boot 2230. Tightening the fasteners 3102 pulls the flange portion 2236 toward the wall 2204, compressing the sealing member 2238 between the flange portion 2236 and the wall 2204 and forming a seal. Any kind of fastener may be used in place of the fasteners 3102 and threaded portions 3104, such as, for example, screws, bolts, brads, rivets, snaps, quarter-turn fasteners, or the like.

Referring now to FIGS. 32, and 32A, an exemplary duct boot retention system is shown. The retention system includes a bracket 3200 secured between wall studs 3204. A biasing member 3202 attaches to both the bracket 3200 and the duct boot 2232. The biasing member 3202 biases the duct boot 2232 toward the wall board 2204 to compress the sealing member 2238 against the wall board 2204, thereby forming a seal. An installer installs the bracket 3200 between the studs 3204 and then attaches the duct boot 2232 to the biasing member 3202. The wall board 2204 is pressed by the installer against the duct boot sealing member 2238 with an installation force 3210. The wall board 2204 is then secured by the installer to the studs 3204 with fasteners 3206. The retention system illustrated by FIGS. 32 and 32A, accommodate any shape duct boot.

Figure 33:
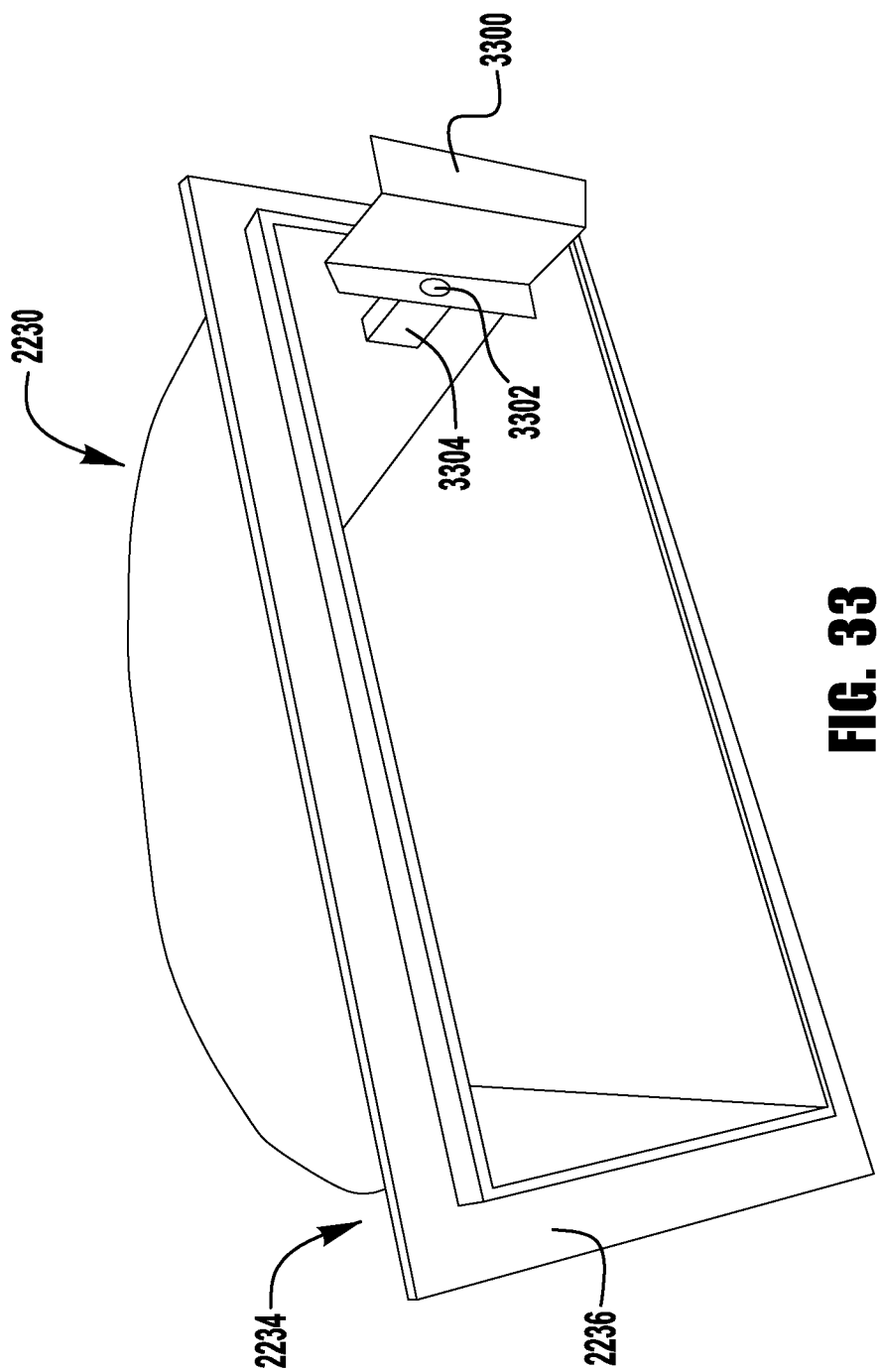
FIG. 33 is a perspective view of an exemplary duct boot retention system.

Referring now to FIGS. 33, and 33A, an exemplary retention bracket 3300 is shown. Fasteners 3302 attach the brackets 3300 to threaded portions 3304 disposed inside the outlet portion 2234 of the duct boot 2230. Tightening the fasteners 3302 pulls the flange portion 2236 of the duct boot 2230 toward the wall 2204, compressing the sealing member 2238 between the flange portion 2236 and the wall 2204 and forming a seal. Any kind of fastener may be used in place of the fasteners 3302 and threaded portions 3304, such as, for example, screws, bolts, brads, rivets, snaps, quarter-turn fasteners, or the like. The retention brackets illustrated by FIGS. 33 and 33A, accommodate any shape duct boot.

While various inventive aspects, concepts and features of the disclosures may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts and features of the disclosures—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present application even if such embodiments are not expressly disclosed herein. Additionally, even though some features, concepts or aspects of the disclosures may be described herein as being a preferred arrangement or method, such description is not intended to suggest that such feature is required or necessary unless expressly so stated. Still further, exemplary or representative values and ranges may be included to assist in understanding the present application, however, such values and ranges are not to be construed in a limiting sense and are intended to be critical values or ranges only if so expressly stated. Moreover, while various aspects, features and concepts may be expressly identified herein as being inventive or forming part of an disclosure, such identification is not intended to be exclusive, but rather there may be inventive aspects, concepts and features that are fully described herein without being expressly identified as such or as part of a specific disclosure, the disclosures instead being set forth in the appended claims. Descriptions of exemplary methods or processes are not limited to inclusion of all steps as being required in all cases, nor is the order that the steps are presented to be construed as required or necessary unless expressly so stated. The words used in the claims have their full ordinary meanings and are not limited in any way by the description of the embodiments in the specification.

As described herein, when one or more components are described as being connected, joined, affixed, coupled, attached, or otherwise interconnected, such interconnection may be direct as between the components or may be in direct such as through the use of one or more intermediary components. Also as described herein, reference to a "member," "component," or "portion" shall not be limited to a single structural member, component, or element but can include an assembly of components, members or elements. Also as described herein, the terms "substantially" and "about" are defined as at least close to (and includes) a given value or state (preferably within 10% of, more preferably within 1% of, and most preferably within 0.1% of).

What is claimed is:
1. A duct connection system comprising:
a first duct connector configured for use with a rigid duct member, the first duct connector having:
a tube portion having a first end, a second end, an outer surface, and an inner surface;
a mating portion disposed at the first end of the tube portion;

a flange portion disposed on the outer surface of the tube portion at the first end, the flange portion having a front side, a back side, and an opening;

a sealing member disposed at the back side of the flange portion;

one or more securing members extending from a first end disposed at the front side of the flange portion to a second end disposed beyond the sealing member; and one or more tab members attached to the second end of the one or more securing members, wherein the tab members are moved between an un-deployed and a deployed position by the one or more securing members;

a second duct connector configured for use with a flexible duct, the second duct connector having:

a tube portion having a first end, a second end, an outer surface, and an inner surface, the second end including an annular ridge disposed on the outer surface;

a mating portion disposed at the first end of the tube portion;

a flange portion disposed on the outer surface of the tube portion at the first end, the flange portion having a front side, a back side, an opening, and an annular collar portion extending axially toward the second end of the tube portion, the annular collar portion having an outer surface and an annular ridge disposed on the outer surface; and a sealing member disposed at the front side of the flange portion.

2. The duct connection system of claim 1, wherein the mating portion of the first duct connector and the mating portion of the second duct connector are connected.

3. The duct connection system of claim 1, wherein the first duct connector is assembled to a rigid duct.

4. The duct connection system of claim 1, wherein the second duct connector is assembled to a flexible duct.

5. The duct connection system of claim 1, wherein the first duct connector is a male connector and the second duct connector is a female connector.

6. The duct connection system of claim 1, wherein the first duct connector is a female connector and the second duct connector is a male connector.

7. The duct connection system of claim 1, wherein the mating portion of the first duct connector and the mating portion of the second duct connector each have a mating surface comprising at least one annular ridge with a barb-shaped cross-section.

8. The duct connection system of claim 7, wherein the mating surfaces of the first and second duct connectors further include an annular surface with a ramped cross-section such that pushing the first and second duct connectors together causes the mating surfaces of the first and second duct connectors to release from each other.

* * * * *